(12) United States Patent
Watanabe

(10) Patent No.: US 7,406,193 B2
(45) Date of Patent: Jul. 29, 2008

(54) IMAGE PROCESSING METHOD AND IMAGE PROCESSING APPARATUS FOR MAKING LUMINANCE CORRECTION

(75) Inventor: Kazuyo Watanabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 651 days.

(21) Appl. No.: 10/802,681

(22) Filed: Mar. 17, 2004

(65) Prior Publication Data

US 2004/0184673 A1 Sep. 23, 2004

(30) Foreign Application Priority Data

Mar. 17, 2003 (JP) ............................. 2003-071267

(51) Int. Cl.
*G06K 9/00* (2006.01)
(52) U.S. Cl. ...................... 382/168; 382/286; 382/291; 348/94; 348/135
(58) Field of Classification Search .................. 382/168
See application file for complete search history.

(56) References Cited

U.S. PATENT DOCUMENTS

| | | | | |
|---|---|---|---|---|
| 4,929,979 | A * | 5/1990 | Kimoto et al. ................. | 355/38 |
| 5,012,333 | A * | 4/1991 | Lee et al. ...................... | 358/520 |
| 5,123,060 | A * | 6/1992 | Cho et al. ..................... | 382/274 |
| 5,668,890 | A * | 9/1997 | Winkelman .................. | 382/167 |
| 5,748,773 | A * | 5/1998 | Tashiro et al. ................ | 382/169 |
| 5,748,802 | A * | 5/1998 | Winkelman .................. | 382/271 |
| 5,874,988 | A * | 2/1999 | Gu ................................ | 348/97 |
| 5,995,665 | A * | 11/1999 | Maeda ......................... | 382/232 |
| 6,040,860 | A * | 3/2000 | Tamura et al. ............... | 348/252 |
| 6,351,558 | B1 * | 2/2002 | Kuwata ....................... | 382/168 |
| 6,371,373 | B1 * | 4/2002 | Ma et al. ................. | 235/462.1 |
| 2002/0071041 | A1 * | 6/2002 | Pine ............................ | 348/222 |
| 2002/0136459 | A1 * | 9/2002 | Imagawa et al. ............ | 382/218 |
| 2002/0183963 | A1 * | 12/2002 | Kocimski .................... | 702/167 |
| 2003/0002736 | A1 * | 1/2003 | Maruoka et al. ............ | 382/168 |
| 2003/0038984 | A1 * | 2/2003 | Ohkawa ....................... | 358/462 |
| 2003/0099407 | A1 * | 5/2003 | Matsushima ................ | 382/274 |

FOREIGN PATENT DOCUMENTS

| | | | |
|---|---|---|---|
| JP | 2000-134467 A | | 5/2000 |
| JP | 2000134467 A | * | 5/2000 |
| JP | 2001-243463 A | | 9/2001 |
| JP | 2002-092607 A | | 3/2002 |
| JP | 2002-247361 A | | 8/2002 |
| JP | 2002-288650 A | | 10/2002 |

* cited by examiner

*Primary Examiner*—Vikkram Bali
*Assistant Examiner*—David P Rashid
(74) *Attorney, Agent, or Firm*—Panitch Schwarze Belisario & Nadel LLP

(57) ABSTRACT

An image processing method of making luminance correction on the basis of a luminance histogram showing luminance level distribution of image data expressing an image by a numerical value. A luminance average value, a luminance standard deviation, and a peak distance in the luminance histogram are obtained. A distribution discrimination value which can discriminate whether the luminance level distribution is deviated on the low/high luminance side in the histogram is compared with the peak distance. A halftone presence/absence discrimination value which can discriminate whether the luminance distribution is not deviated in the halftone in the luminance histogram is compared with the standard deviation. A backlight image is discriminated by the comparison results. An exposing state of an image other than a backlight image is discriminated by using an exposing state discrimination value. The proper luminance correction is made in accordance with the exposing state.

17 Claims, 20 Drawing Sheets

THERE IS THE SAME SIGN AS THAT OF DIFFERENCE BETWEEN TARGET PIXEL AND PIXEL JUST BEFORE IT.
COUNT=COUNT+1

THERE IS NO SAME SIGN AS THAT OF DIFFERENCE BETWEEN TARGET PIXEL AND PIXEL JUST BEFORE IT.
COUNT=COUNT+0

| INDEX | IMAGE WIDTH | IMAGE HEIGHT | ... | SAME IMAGE DISCRIMINATING FLAG | PROCESS START FLAG |
|---|---|---|---|---|---|
| 1 | 640 | 320 | ... | 1 | 1 |
| 2 | 640 | 320 | ... | 1 | 1 |
| 3 | 320 | 400 | ... | 0 | 0 |
| ... | | | | | | ium # IMAGE PROCESSING METHOD AND IMAGE PROCESSING APPARATUS FOR MAKING LUMINANCE CORRECTION

BACKGROUND OF THE INVENTION

1. Field of the Invention

The invention relates to an image processing method and an image processing apparatus for making luminance correction on the basis of a histogram showing luminance of image data.

2. Related Background Art

Image data obtained by photographing an object by a digital camera, image data in which an image on a film of a silver salt photograph obtained by photographing an object is digitized by a film scanner, or the like is constructed by a plurality of pixels. Each pixel can be shown by, for example, a level of a luminance signal of 256 gradations in a range from 0 to 255. In the image data comprising the pixels, distribution of the luminance signal level is shown in the diagrams.

FIGS. 20 and 21 are luminance histograms of image data in which the luminance distribution is deviated to a low luminance side and a whole image is too dark. FIGS. 22 and 23 are luminance histograms of image data in which the luminance distribution is deviated to a high luminance side and a whole image is too bright. The image data of such luminance histograms causes a problem in which since the whole image is too dark or too bright, it is difficult to distinguish details of the object.

FIG. 24 shows a luminance histogram of image data in which although luminance is distributed as a whole, an intermediate area is small and which is obtained by photographing an object in a backlight situation or by photographing it at night by using a flash. The image data of such a luminance histogram causes a problem in which color expression is poor.

To solve the above problems, an image processing method is disclosed in JP-A-2000-134467. According to a conventional image processing method, an exposing state of image data is discriminated on the basis of the number of peak areas of a luminance histogram of the image data, an average value of luminance in the peak areas, or the like. For example, when there is one peak position and the average value of the luminance is larger than a predetermined reference value, it is determined to be over-exposure. When there are a plurality of peaks, the luminance average value is within a range of the predetermined reference value, and a difference between a highlight level and a shadow level is equal to or larger than a reference value, it is determined to be proper exposure. In other cases, it is determined to be the image data obtained, for example, by strobo-photographing an object in a backlight situation or at night. The image data is corrected in accordance with a result of each discrimination.

For example, when photographing a scenery in which the background is the sky, an object is a monochromatic building whose object is darker than the background, and its area ratio is equal to about ½, a histogram which is obtained when the exposure upon photographing is an under-exposure is as shown in FIG. 26 in which peak areas of luminance distribution exist at two positions on the low luminance side. A histogram which is obtained when the exposure upon photographing is an over-exposure is as shown in FIG. 27 in which peak areas of luminance distribution exist at two positions on the high luminance side.

According to the conventional image processing method, when there are a plurality of peak areas, it is determined to be the backlight or standard exposure. Therefore, luminance of the image of the under-exposure in which the peak areas exist at two positions or the image of the over-exposure in which the peak areas exist at two positions cannot be accurately corrected.

SUMMARY OF THE INVENTION

In consideration of the above problems, it is an object of the invention to provide an image processing method and an image processing apparatus which can properly make luminance correction in accordance with an exposing state of the image data.

To accomplish the above object, the invention uses the following conditions.

According to the present invention, there is provided an image processing method of making luminance correction on the basis of a luminance histogram showing distribution of a luminance level of image data, comprising the steps of:

obtaining a luminance average value in the luminance histogram and a peak distance showing a distance between peaks in the luminance histogram;

comparing a distribution discrimination value which can discriminate whether a distribution deviation of the luminance level exists on a low luminance side or a high luminance side in the luminance histogram or not with the distance between the peaks, thereby discriminating whether the image data is data of a backlight image or not on the basis of a result of the comparison; and comparing the luminance average value with an exposing state discrimination value which can discriminate the exposing state, thereby discriminating whether the image data is data of an image other than the backlight image or not.

According to the present invention, there is further provided an image processing method of making luminance correction on the basis of a luminance histogram showing distribution of a luminance level of image data in which an image is expressed by a numerical value, comprising the steps of:

obtaining a luminance average value in the luminance histogram, a luminance standard deviation indicative of a degree of dispersion of luminance distribution from the luminance average value, and a peak distance showing a distance between peaks in the luminance histogram;

comparing a distribution discrimination value which can discriminate whether a distribution deviation of the luminance level exists on a low luminance side or a high luminance side in the luminance histogram or not with the obtained peak distance, comparing a halftone presence/absence discrimination value which can discriminate whether the distribution deviation of the luminance levels does not exist in a halftone in the luminance histogram or not with the obtained standard deviation, thereby discriminating whether the image is a backlight image or not on the basis of results of the comparisons; and comparing each of the luminance average value and the luminance standard deviation by using an exposing state discrimination value which can discriminate the exposing state, thereby discriminating an exposing state of an image other than the backlight image.

In the image process of the image processing method, luminance correction according to a backlight process to the backlight image, an under-exposure process to an under-exposure image, an over-exposure process to an over-exposure image, and a standard exposure process to a standard exposure image is made in accordance with the exposing state of the image.

Further, in the under-exposure process, in a histogram of the under-exposure image, the histogram is stretched in accordance with the histogram of the under-exposure image so as to shift the luminance average value existing on the low luminance side toward a predetermined value of the histogram.

Further, in the over-exposure process, in a histogram of the over-exposure image, the histogram is stretched in accordance with the histogram of the over-exposure image so as to shift the luminance average value existing on the high luminance side toward a predetermined value of the histogram.

Further, in the standard exposure process, in a histogram of the standard exposure image, the luminance average value is shifted toward a predetermined value in accordance with the histogram.

Further, in the backlight process, a histogram of the backlight image is divided into halves, the histogram on the low luminance side is stretched in accordance with the histogram of the backlight image so as to shift the luminance average value existing on the low luminance side toward a predetermined value, and the histogram on the high luminance side is stretched in accordance with the histogram of the backlight image so as to shift the luminance average value existing on the high luminance side toward the predetermined value.

Furthermore, in the backlight process, contacts where the histogram on the low luminance side and the histogram on the high luminance side have been respectively stretched are smoothly shown by using a three-dimensional function.

Further, in the image processing method, the predetermined value is an intermediate value in the histogram.

Further, in the image processing method, prior to discriminating the exposing state, whether the image data is artificially formed image data or not is discriminated, and if it is determined that the image data is the artificially formed image data, the luminance correction is not made to the image data.

Further, in the image processing method, if it is determined that the image data is a part of a series of image data constructed by a plurality of data, the image process is executed to the image data obtained by collecting a series of image data.

According to the present invention, there is provided a image processing apparatus for making luminance correction on the basis of a luminance histogram showing distribution of a luminance level of image data in which an image is expressed by a numerical value, comprising:

a luminance average value obtaining unit which obtains a luminance average value in the luminance histogram;

a luminance standard deviation obtaining unit which obtains a luminance standard deviation indicative of a degree of dispersion of luminance distribution from the luminance average value in the luminance histogram;

a peak distance obtaining unit which obtains a distance between peaks of luminance level distribution in the luminance histogram;

an exposure discriminating unit which compares a distribution discrimination value which can discriminate whether a distribution deviation of the luminance level exists on a low luminance side or a high luminance side in the luminance histogram or not with the obtained peak distance, compares a halftone presence/absence discrimination value which can discriminate whether the distribution deviation of the luminance levels does not exist in a halftone in the luminance histogram or not with the obtained standard deviation, discriminates whether the image is a backlight image or not on the basis of results of the comparisons, and compares each of the luminance average value and the luminance standard deviation by using an exposing state discrimination value which can discriminate the exposing state, thereby discriminating an exposing state of an image other than the backlight image; and a correction processing unit which makes the luminance correction on the basis of a result of the discrimination of the exposure discriminating unit.

Further, the image processing apparatus may comprise an artificial image discriminating unit which discriminates whether the image data is artificially formed image data or not prior to the discrimination of the exposure discriminating unit, and wherein when it is determined by the artificial image discriminating unit that the image data is the artificially formed image data, the correction processing unit does not make the luminance correction to the image data.

Moreover, the image processing apparatus may comprise a same image discriminating unit which discriminates whether the image data is a series of image data constructed by a plurality of data or not, and wherein if the same image discriminating unit determines that the image data is same banded image data, the image process is executed to the image data obtained by collecting a series of image data.

The above and other objects and features of the present invention will become apparent from the following detailed description and the appended claims with reference to the accompanying drawings.

DETAILED DESCRIPTION OF THE PREFERRED EMBODIMENTS

The invention will be described in detail hereinbelow with respect to embodiments shown in the diagrams.

Embodiment 1

A printer and a monitor are connected to a computer. An application, an OS (Operating System), and a printer driver which processes various command groups which are issued to the OS by the application are provided as software for the computer.

On the basis of an application display screen which is displayed on the monitor, the user forms application data by using text data such as characters or the like, graphic data such as graphics, image data such as a natural image, or the like. When the formed application data is printed, a print output request is issued to the OS from the application. A draw command group in which the text data comprises a text draw command, the graphic data comprises a graphic draw command, and the image data comprises an image draw command are outputted to the OS. The OS which received the output request outputs the print request and the draw command group to the driver corresponding to the printer for executing printing. On the basis of the draw command group and the output request from the OS, the printer driver forms print data which can be processed by the printer and outputs the print data to the printer.

When the printer is a raster printer, if a command from the OS is the draw command regarding the image data such as graphic data, image data, or the like, the printer driver sequentially executes a correcting process to the image data. After that, the driver sequentially develops (rasterizes) the corrected image data into a page memory of RGB 24 bits. After completion of the rasterization with respect to all draw commands, contents in the RGB 24-bit page memory are converted into a CMYK format and outputted as print data to the printer.

Figure 2:
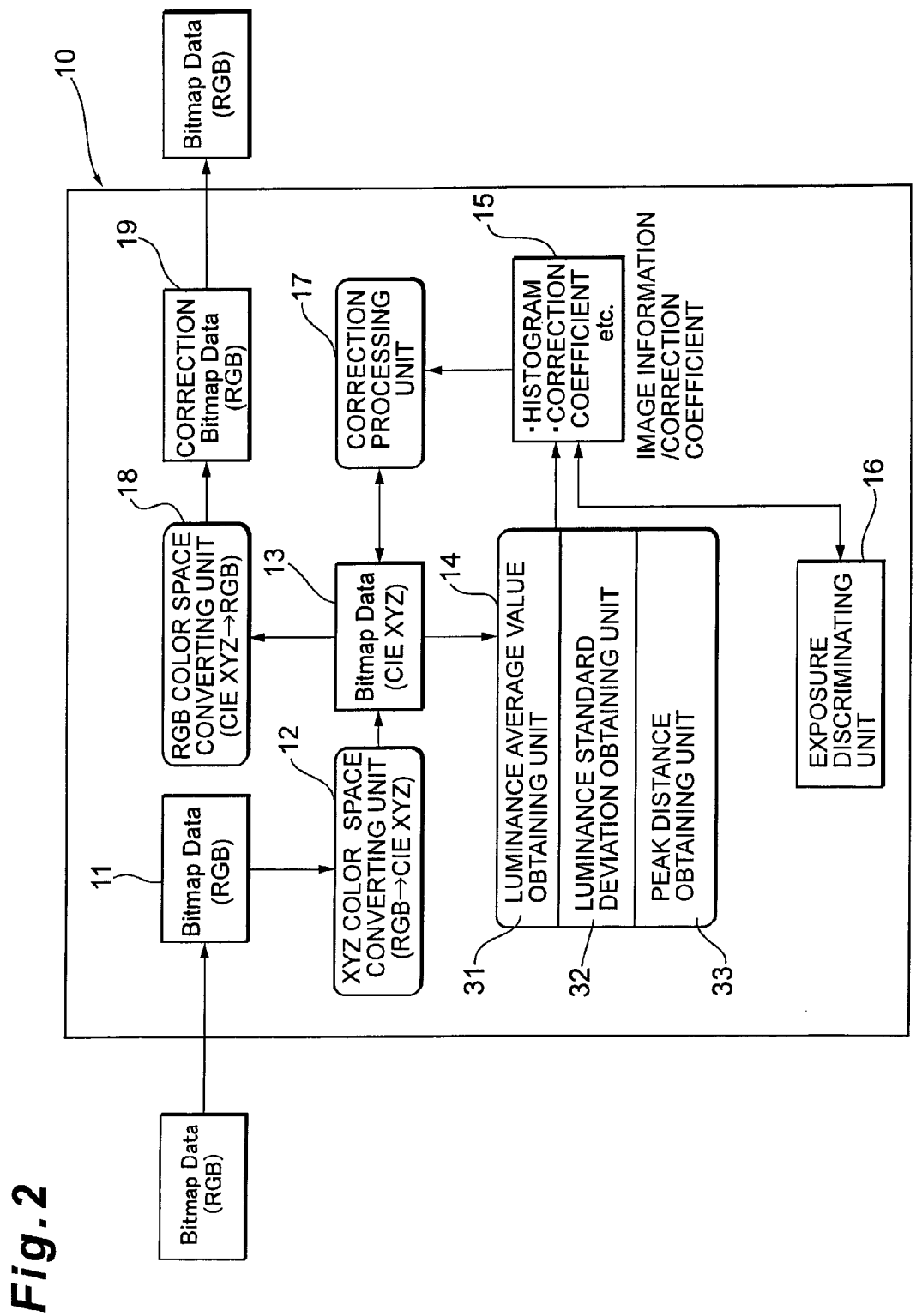
FIG. 2 is a block diagram showing an image processing apparatus according to the embodiment 1.

FIG. 2 is a block diagram showing a construction of an image processing apparatus 10 for executing the foregoing image correcting process.

The image processing apparatus 10 comprises: an RGB bitmap holding unit 11 which copies and holds an RGB bitmap image of an address indicated by a pointer on the basis of the pointer included in the draw command which is outputted from the OS; an XYZ color space converting unit 12 which converts RGB values held in the RGB bitmap holding unit 11 into values of an XYZ colorimetric system of CIE (International Commission on Illumination); an XYZ bitmap holding unit 13 which holds the XYZ values of CIE converted by the XYZ color space converting unit 12; an arithmetic operation processing unit 14 which forms a histogram of a luminance value Y on the basis of the XYZ bitmap held in the XYZ bitmap holding unit 13 and calculates a luminance average value, a luminance standard deviation, luminance peaks, and a distance between the luminance peaks as a luminance peak distance on the basis of the histogram; a luminance information holding unit 15 which holds the various values calculated by the arithmetic operation processing unit 14 as luminance information; an exposure discriminating unit 16 which discriminates an exposing state of the image by comparing the luminance information held in the luminance information holding unit 15 by using a predetermined value and stores a result of the discrimination into the luminance information holding unit 15; a correction processing unit 17 which makes luminance correction in accordance with the exposing state discriminated by the exposure discriminating unit 16; an RGB color space converting unit 18 which converts the XYZ values of CIE corrected by the correction processing unit 17 into RGB values; and a correction RGB bitmap holding unit 19 which holds the RGB values converted by the RGB color space converting unit 18.

The arithmetic operation processing unit 14 comprises: a luminance average value obtaining unit 31 which obtains a luminance average value in the histogram; a luminance standard deviation obtaining unit 32 which obtains a luminance standard deviation indicative of a degree of dispersion of luminance distribution in the histogram from the luminance average value; and a peak distance obtaining unit 33 which obtains a peak distance showing the distance between the peaks in the histogram.

Figure 3:
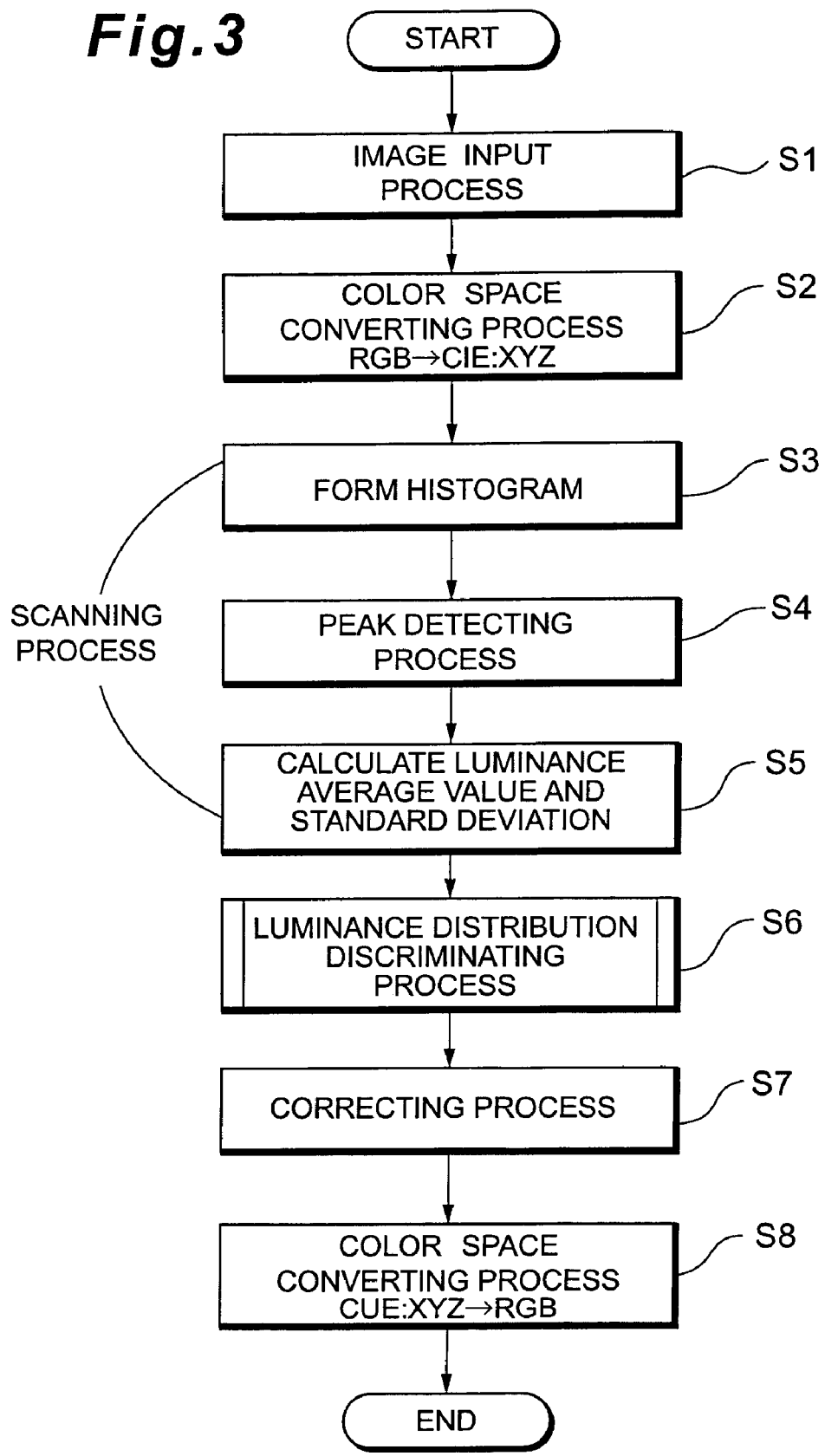
FIG. 3 is a flowchart showing the operation of the image processing apparatus according to the embodiment 1.

The operation of the image processing apparatus 10 will now be described with reference to a flowchart of FIG. 3.

A pointer included in the draw command which is outputted from the OS indicates an address of the image data comprising a plurality of pixels such as graphic data, image data, or the like. A bitmap image of the RGB colorimetric system of the address is copied and held in the RGB bitmap holding unit 11 (step S1).

With respect to each pixel of the image data held in the RGB bitmap holding unit 11, the RGB values are converted into values of the XYZ colorimetric system of CIE by a conventionally well-known method (step S2).

By color-space converting the RGB values into the XYZ values, the luminance of the image data is shown by the Y value.

The converted XYZ values of CIE are held in the XYZ bitmap holding unit 13. By a luminance correcting process, which will be explained hereinafter, correction regarding the luminance is executed to the image data of the XYZ colorimetric system held in the XYZ bitmap holding unit 13.

After that, the arithmetic operation processing unit 14 forms a luminance histogram based on the Y value of the image data converted into the XYZ values of CIE held in the XYZ bitmap holding unit 13 (step S3). The luminance histogram is degree distribution in which the luminance signal level is shown by 256 gradations in a range from 0 to 255 and each pixel is made to correspond to those gradations.

The peak distance obtaining unit 33 of the arithmetic operation processing unit 14 calculates a distance between the peaks of the histogram on the basis of the formed luminance histogram (step S4).

The calculation of the peak distance will now be described with reference to the drawings.

Figure 4:
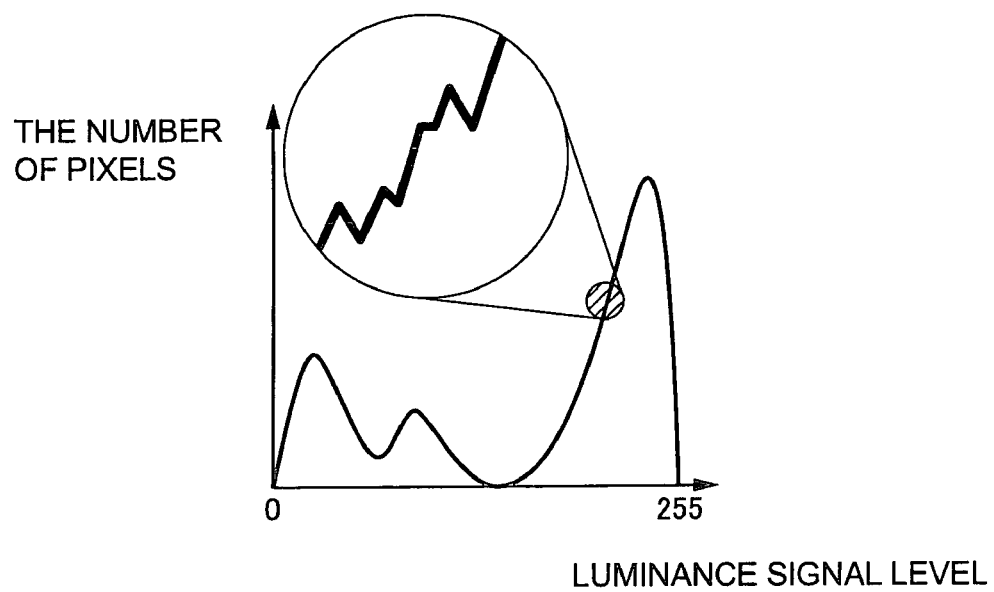
FIG. 4 is an enlarged diagram of a luminance histogram.
Figure 5:
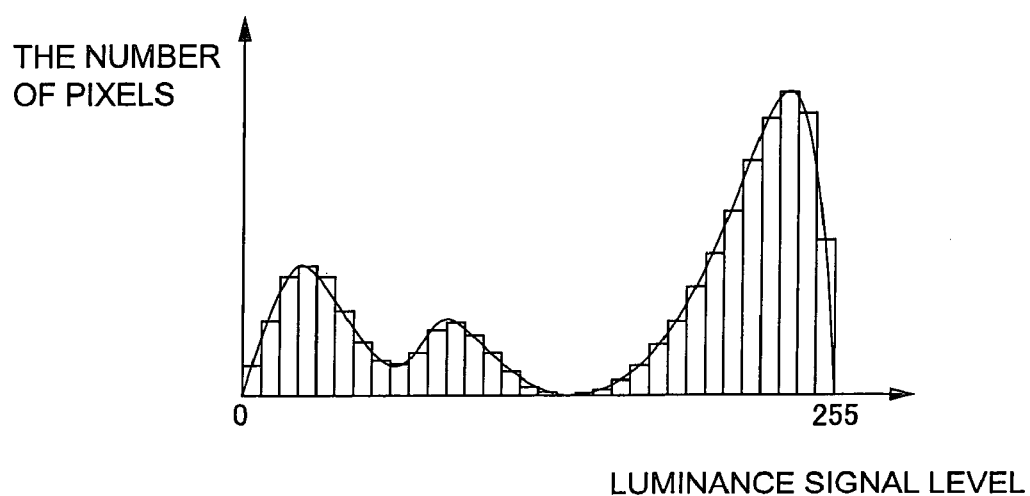
FIG. 5 is a luminance histogram in which the number of gradations is changed from 256 gradations to 32 gradations.

As for the peaks of the luminance histogram, as shown in FIG. 4, when the peak is detected by a simple increase/decrease in degree a micro increase/decrease is also detected as a peak. To prevent such a situation, 256 gradations are converted into, for example, 32 gradations corresponding to ⅛ of 256 gradations as shown in FIG. 5. By the conversion, the peak detection due to the micro increase/decrease of the histogram can be prevented.

Figure 6:
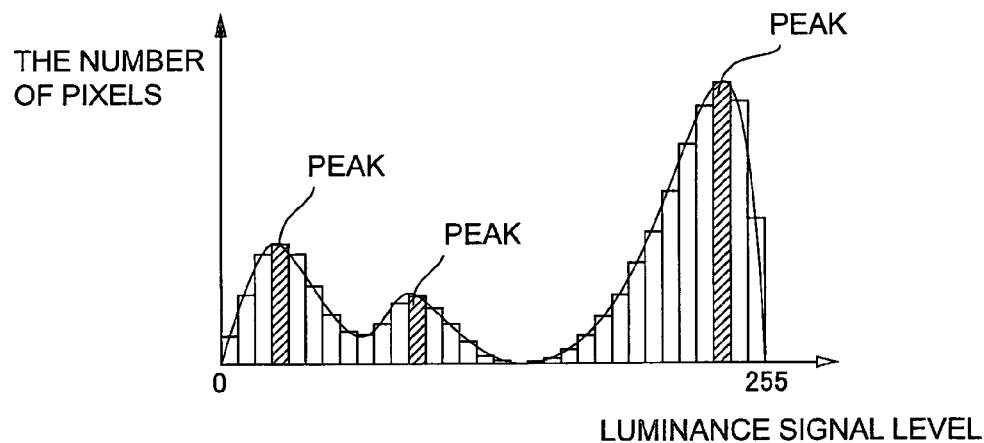
FIG. 6 is a diagram showing peak detection of the luminance histogram.
Figure 7:
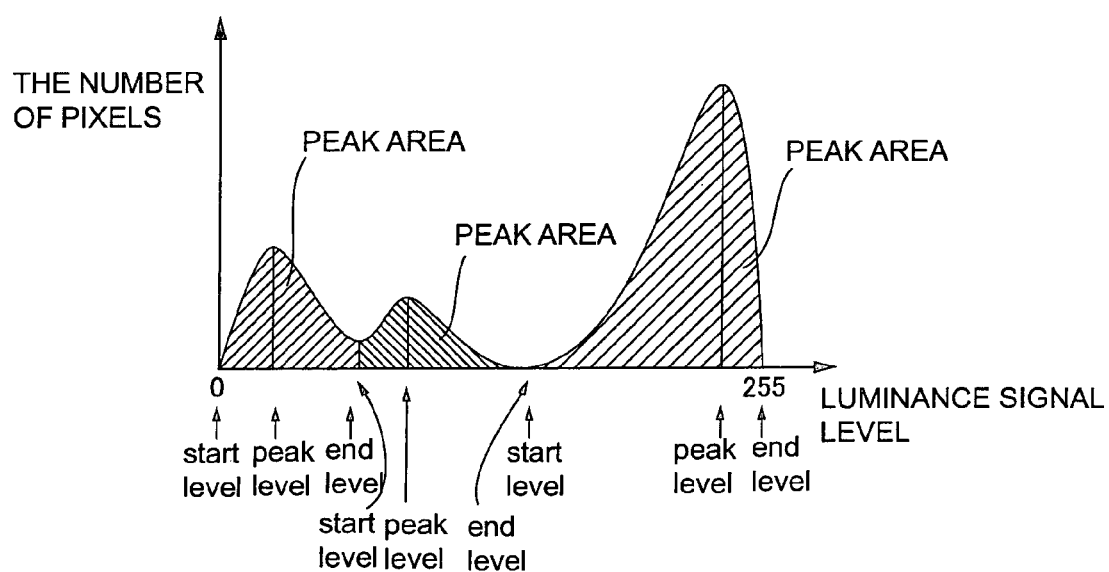
FIG. 7 is a diagram showing peak areas in the luminance histogram.

Subsequently, as shown in FIG. 6, in a luminance histogram coarsely converted from 256 gradations into 32 gradations, areas including the peaks of the luminance signal levels (hereinafter, referred to as peak areas) are selected. In the peak area, assuming that the highest luminance signal level is the peak level, as shown in FIG. 7, an end level of the peak area becomes a start level of the next peak area. In FIG. 7, the start level in the peak area at the left edge is equal to 0 and the end level in the peak area at the right edge is equal to 255.

Subsequently, an area of the peak area in a range from the start level to the end level is calculated. This area denotes the sum of degrees in the range from the start level to the end level of each peak area.

After the areas of all of the peak areas were calculated, three peak areas are selected as three large peak areas in order of the largest area. Among the distances between the peak levels of the three large peak areas, the longest distance is calculated as a 3-large-peak maximum distance. The 3-large-peak maximum distance is simply referred to as a peak distance hereinbelow and this peak distance is used for a subsequent discrimination.

Further, the luminance average value obtaining unit 31 of the arithmetic operation processing unit 14 calculates a luminance average value showing an average value in the formed luminance histogram on the basis of this histogram. The luminance standard deviation obtaining unit 32 calculates the luminance standard deviation indicative of the degree of dispersion of the luminance distribution in the luminance average value by the conventionally well-known method (step S5). Unlike the conventional average value in the peak area, the luminance average value which is calculated in the invention is the average value of the luminance in the histogram, that is, the average value of the luminance values in all pixels.

Various values calculated by the arithmetic operation processing unit 14 are held as luminance information into the luminance information holding unit 15. After that, the exposure discriminating unit 16 discriminates the exposing state of the image data on the basis of the luminance information held in the luminance information holding unit 15 and luminance correction is made in accordance with a result of the discrimination (step S6).

The operation of the exposure discriminating unit 16 will now be described with reference to a flowchart of FIG. 1.

With reference to the luminance standard deviation and the peak distance held in the luminance information holding unit 15, the exposure discriminating unit 16 compares a distribution discrimination value which can discriminate whether a distribution deviation of the luminance levels exists on the low luminance side and the high luminance side in the luminance histogram or not with the obtained peak distance and compares a halftone presence/absence discrimination value which can discriminate whether the distribution deviation of the luminance levels does not exist in the halftone in the luminance histogram or not with the obtained standard deviation. In the embodiment, as an example of the distribution discrimination value and the halftone presence/absence discrimination value which are used for the comparison, (the luminance standard deviation>80) and (the peak distance>192) are used (step S101).

In this case, whether the distance between arbitrary peak areas in the luminance histogram is large, the luminance average value exists on either the high luminance side or the low luminance side, and a dispersion of the luminance distribution exists near the luminance average value or not is discriminated. In other words, whether the peak areas exist on the high luminance side and the low luminance side and a large peak area exists in the 3-large-peak maximum distance, that is, near the halftone or not is discriminated.

Figure 24:
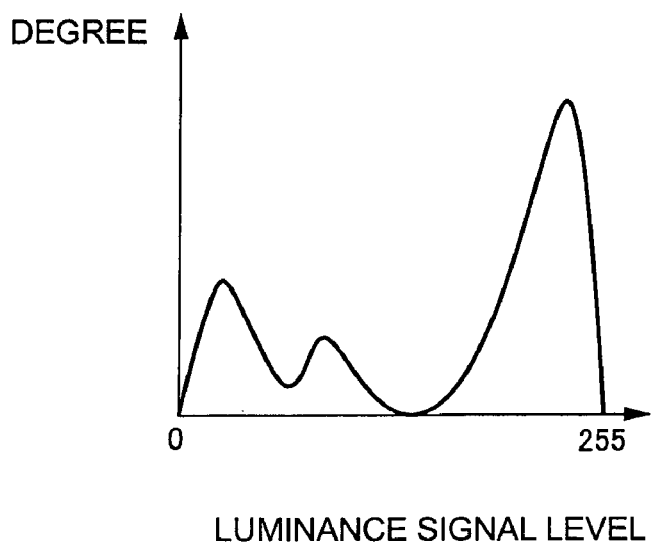
FIG. 24 is a luminance histogram in which halftone is not frequently used.

In this discrimination, if it is discriminated that (the luminance standard deviation>80) and (the 3-large-peak maximum distance>192), as shown in FIG. 24, it is determined that the photographed image is an image obtained by photographing an object in what is called a backlight situation or a strobo-photographed image at night in which although the luminance signal level is distributed in the whole luminance histogram, there is a deviation in the distribution of the luminance histogram and there is no halftone in the luminance histogram (hereinafter, the backlight image and the strobo-photographed image at night are simply referred to as backlight images) (step S115).

The luminance correcting process subsequent to step S115 is referred to as a backlight process.

The luminance histogram in the backlight image will now be described.

Figure 25:
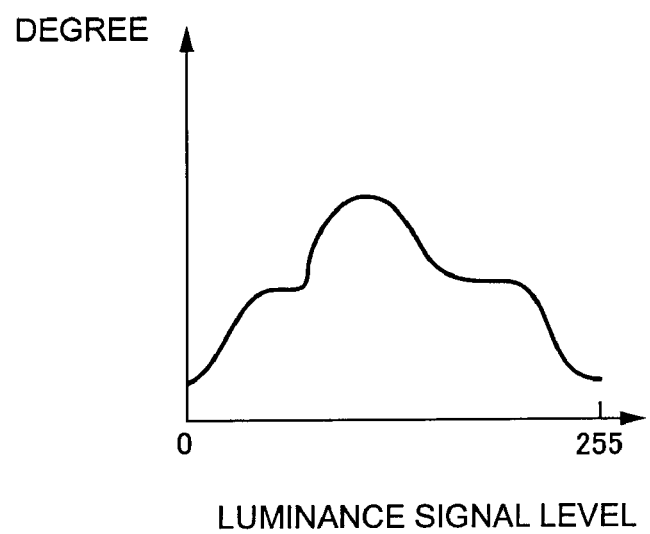
FIG. 25 is a luminance histogram in which luminance is distributed to the whole luminance area.
Figure 26:
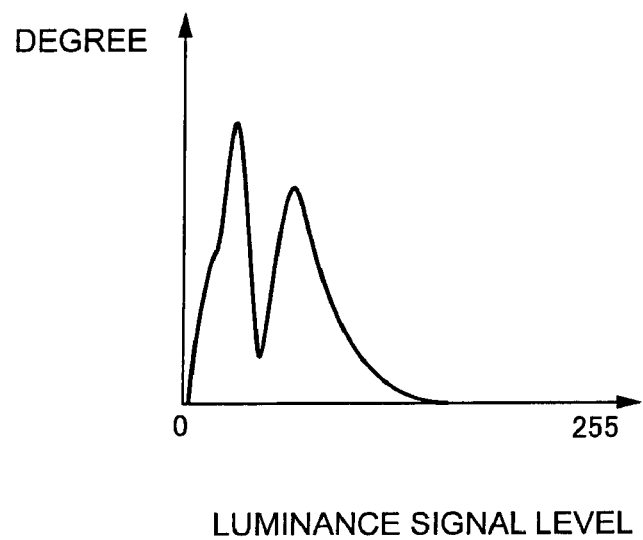
FIG. 26 is a luminance histogram having a plurality of peaks on the low luminance side.
Figure 27:
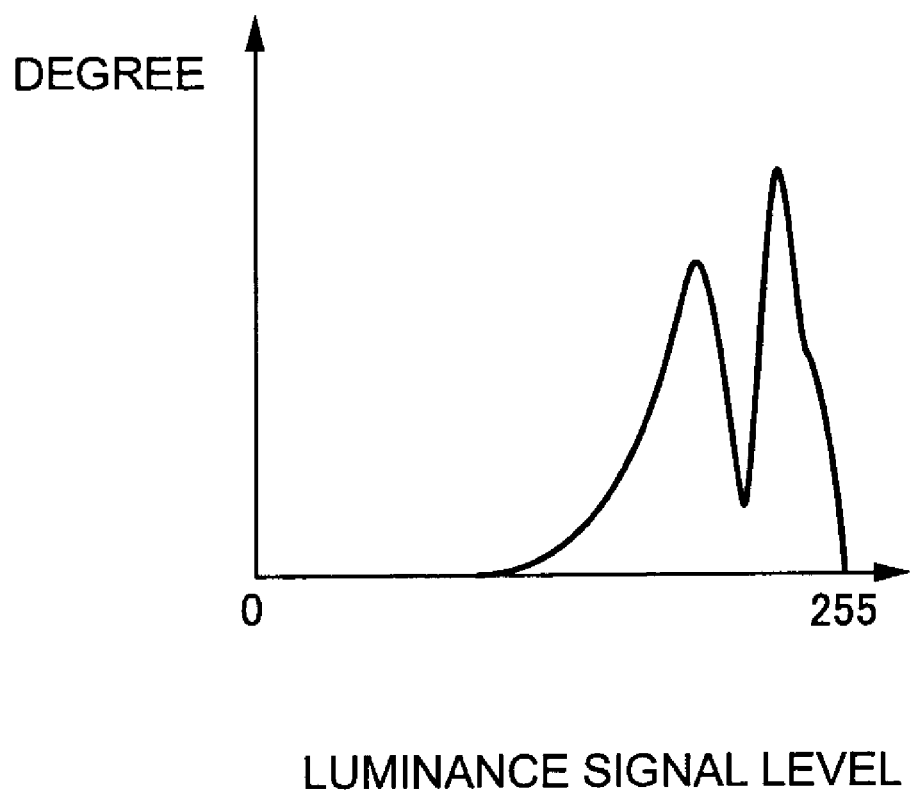
FIG. 27 is a luminance histogram having a plurality of peaks on the high luminance side.

It has been known that in the luminance histogram in the backlight shown in FIG. 24, for example, the peak area in the object and the strong peak area in the backlight exist and expression of the luminance becomes poor in another area, that is, the halftone area due to an influence by the backlight. On the other hand, it has been known that in the luminance histogram of the image obtained by photographing the object in the proper exposing state, for example, as shown in FIG. 25, levels of various luminance signals of the object, background, and the like exist in the whole luminance histogram. In the luminance correcting process, which will be described hereinafter, a process for shifting the peak area which is deviated on the low luminance side or the high luminance side or on both of them to the halftone is executed in accordance with the backlight image or the exposing state in order to distribute the luminance level in the whole luminance histogram.

In the invention, by discriminating the maximum distance among a plurality of peak areas as a feature of the backlight image and discriminating whether the peak area does not exist in the halftone in the range shown by such a distance and the deviation in peak area exists on the high luminance side and the low luminance side or not instead of discriminating the backlight image on the basis of only the number of peaks of the histogram, whether the image data is the backlight data or not can be properly discriminated also with respect to the image data having a plurality of peak areas of an image other than the backlight image and the strobo-image which was photographed at night.

In step S101 of the flowchart of FIG. 1 again, if the exposure discriminating unit 16 determines that (the luminance standard deviation>80) and (the 3-large-peak maximum distance>192) are not satisfied, that is, the image data is not the backlight image nor the strobo-image photographed at night, the luminance average value held in the luminance information holding unit 15 is referred to and compared with the discrimination value of the exposing state. In the embodiment, the value showing (the luminance average value<96) is used as an exposing state discrimination value (step S102).

That is, in the image of the under-exposure, since the distribution of the luminance level in the luminance histogram is deviated on the low luminance side and the luminance average value at such a luminance level is generally small, whether the image is an image of the under-exposure or not can be discriminated by discriminating by a value lower than the half gradations of 256 gradations. By the subsequent process, the under-exposure is discriminated at three gradations in accordance with a degree of deviation to the under-exposure side. Also, with respect to the over-exposure, the discrimination of three gradations is similarly made in accordance with the degree of deviation. To discriminate the under-exposure and the over-exposure at three gradations mentioned above and to discriminate the image of the standard exposure, the value according to each discrimination is used as an exposing state discrimination value.

If the exposure discriminating unit 16 determines in step S102 that (the luminance average value<96), whether (the luminance standard deviation<80) or not is subsequently discriminated (step S103). By this discrimination, whether the luminance distribution is not dispersed but converged to a region near the luminance average value on the low luminance side or not is discriminated.

Figures 19, 20:
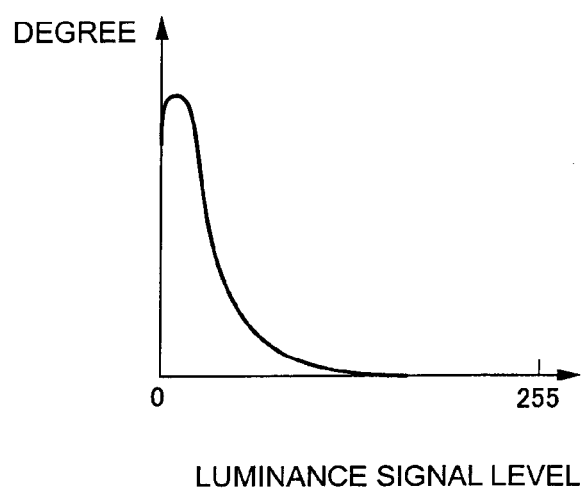
FIG. 19 is a diagram showing an image management table.
FIG. 20 is a luminance histogram in which luminance distribution is extremely deviated to the low luminance side.

When the exposure discriminating unit 16 determines that (the luminance standard deviation<80), as shown in FIG. 20, in the luminance histogram, there is a deviation in dispersion of the luminance distribution and the dispersion is largely deviated to the low luminance side (step S108).

That is, the exposure discriminating unit 16 determines that the image data is image data of the strong under-exposure. The luminance correcting process subsequent to step S108 is referred to as a process of the large under-exposure.

Figure 21:
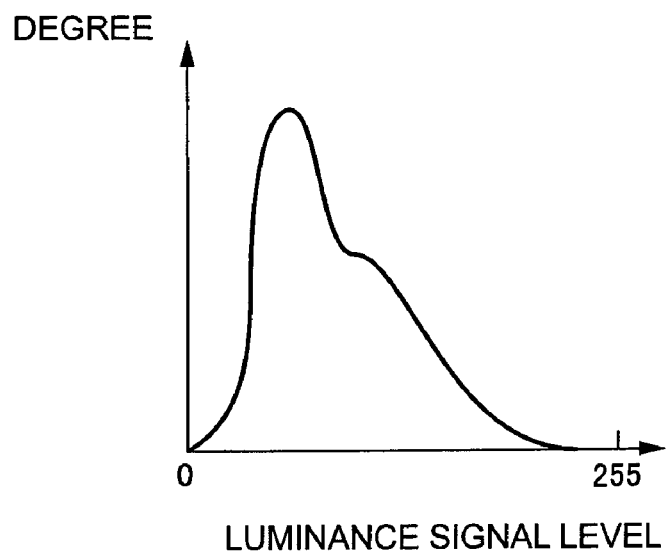
FIG. 21 is a luminance histogram in which luminance distribution is deviated to the low luminance side.

On the contrary, if the exposure discriminating unit 16 determines that (the luminance standard deviation<80) is not satisfied, as shown in FIG. 21, it is determined that in the luminance histogram, there is a deviation in the luminance distribution and the distribution is medium-deviated to the low luminance side (step S109).

That is, the exposure discriminating unit 16 determines that the image data is image data of the under-exposure. The luminance correcting process subsequent to step S109 is referred to as a process of the medium under-exposure.

Returning to step S102, if the exposure discriminating unit 16 determines that (the luminance average value<96) is not satisfied, whether (the luminance average value>160) or not is subsequently discriminated (step S104).

That is, in the image of the over-exposure, the luminance level in the luminance histogram is distributed to the high luminance level. Therefore, since the luminance average value at such a luminance level is generally high, whether the image is an image of the over-exposure or not can be discriminated by discriminating by the luminance average value higher than the half gradations of 256 gradations.

In step S104, if the exposure discriminating unit 16 determines that (the luminance average value>160), whether (the luminance standard deviation<80) or not is subsequently discriminated (step S105). By this discrimination, whether the luminance distribution is not dispersed but converged to a region near the luminance average value on the high luminance side or not is discriminated.

Figure 22:
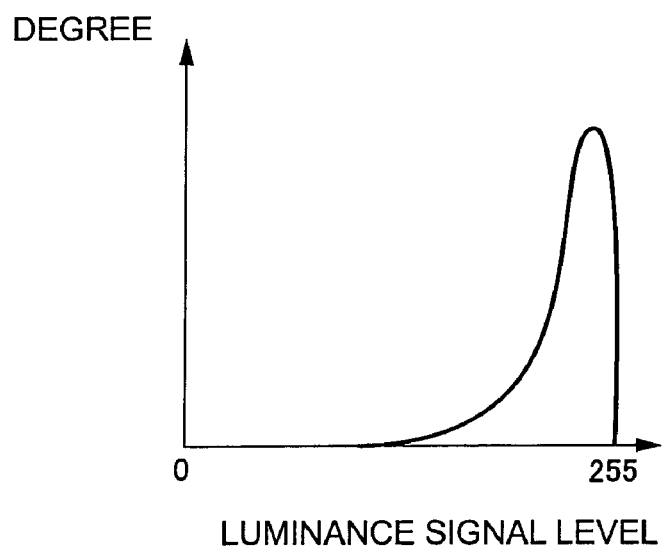
FIG. 22 is a luminance histogram in which luminance distribution is extremely deviated to the high luminance side.

When the exposure discriminating unit 16 determines that (the luminance standard deviation<80), as shown in FIG. 22, in the luminance histogram, there is a deviation in luminance distribution and the distribution is largely deviated to the high luminance side (step S114).

That is, the exposure discriminating unit 16 determines that the image data is image data of the strong over-exposure.

The luminance correcting process subsequent to step S114 is referred to as a process of the large over-exposure.

Figure 23:
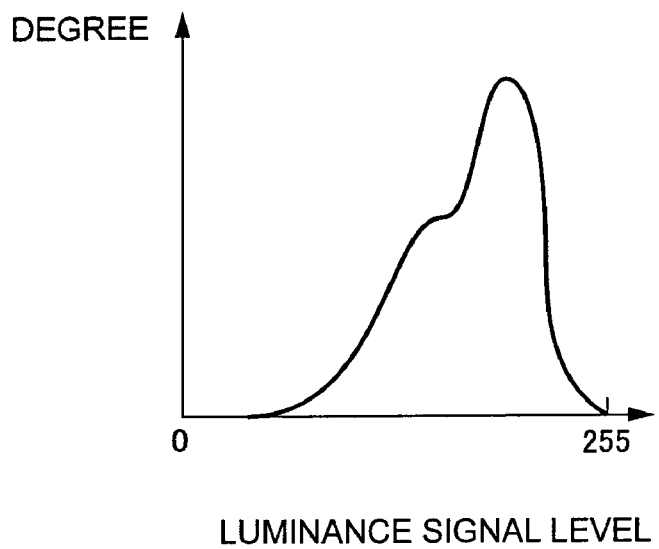
FIG. 23 is a luminance histogram in which luminance distribution is deviated to the high luminance side.

On the contrary, if the exposure discriminating unit 16 determines that (the standard deviation<80) is not satisfied, as shown in FIG. 23, it is determined that in the luminance histogram, there is a deviation in the luminance distribution and the distribution is medium-deviated to the high luminance side (step S113).

That is, the exposure discriminating unit 16 determines that the image data is image data of the over-exposure.

The luminance correcting process subsequent to step S113 is referred to as a process of the medium over-exposure.

Returning to step S104, if the exposure discriminating unit 16 determines that (the luminance average value>160) is not satisfied, whether (the luminance average value<128) or not is subsequently discriminated (step S106).

In this discrimination, whether the intermediate value in the luminance histogram exists on the under-exposure side or not is discriminated with respect to the image data which does not correspond to the backlight, the under-exposure, and the over-exposure discriminated before and which is supposed to be the image in the standard exposure. In other words, whether the luminance histogram in the image data is slightly deviated to the under-exposure side or not is discriminated.

If the exposure discriminating unit 16 determines that (the luminance average value<128), it is determined that in the luminance histogram, there is a deviation in the luminance distribution and the distribution is slightly deviated to the low luminance side (step S110).

That is, the exposure discriminating unit 16 determines that the image data is image data of the slight under-exposure.

The luminance correcting process subsequent to step S110 is referred to as a process of the small under-exposure.

On the other hand, if the exposure discriminating unit 16 determines that (the luminance average value<128) is not satisfied, whether (the luminance average value>132) or not is subsequently discriminated (step S107).

In this discrimination as well, in a manner similar to the discrimination of the under-exposure in step S106 mentioned above, whether the average value in the luminance histogram is equal to or slightly larger than the intermediate value or not is discriminated with respect to the image data which is supposed to be the image in the standard exposure. That is, whether the luminance histogram in the image data is slightly deviated to the over-exposure side or not is discriminated.

If the exposure discriminating unit 16 determines that (the luminance average value>132), it is determined that in the luminance histogram, there is a deviation in the luminance distribution and the distribution is slightly deviated to the high luminance side (step S112).

That is, the exposure discriminating unit 16 determines that the image data is image data of the slight over-exposure.

The luminance correcting process subsequent to step S112 is referred to as a process of the small over-exposure.

If the exposure discriminating unit 16 determines that (the luminance average value>132) is not satisfied, it is determined that the image data is image data which does not correspond to any of the backlight, the under-exposure of three gradations, and the over-exposure of three gradations and in which there is no deviation in the luminance histogram, that is, the image data of the standard exposure (step S111).

The luminance correcting process subsequent to step S111 is referred to as a process of the standard exposure.

Returning to the flowchart of FIG. 3, the operation of the image processing apparatus will be subsequently explained. After the various discriminating processes were executed in the exposure discriminating unit 16, various luminance correcting processes corresponding to discrimination results are executed in the correction processing unit 17. The luminance correcting process is a process for correcting the luminance of the image data in accordance with the exposing state. Prior to the correcting process, parameters such as a correction coefficient and the like are held in the luminance information holding unit 15 in accordance with the correction contents and the luminance of the image data is corrected by using the parameters (step S7).

The image data corrected in the correction processing unit 17 is held in the XYZ bitmap holding unit 13.

Subsequently, the RGB color space converting unit 18 converts a bitmap image of the XYZ colorimetric system of CIE held in the XYZ bitmap holding unit 13 into RGB values by the conventionally well-known method (step S8).

The bitmap data converted into the RGB values is held as corrected bitmap data in the correction RGB bitmap holding unit 19.

To form a raster image into the RGB 24-bit page memory, the printer driver develops (rasterizes) the corrected bitmap data held in the correction RGB bitmap holding unit 19 of the image processing apparatus 10 into the RGB 24-bit page memory.

After that, the printer driver forms data of the CMYK system corresponding to the color reproducibility of each pixel and outputs it to the printer.

A branching process based on the discrimination result about the exposing state of the image data by the exposure discriminating unit 16, that is, the correcting process which is executed to the image data by the correction processing unit 17 will now be described.

The correcting process in the large under-exposure in step S108 and the correcting process in the medium under-exposure in step S109 will now be described with reference to FIG. 8.

Figure 8:
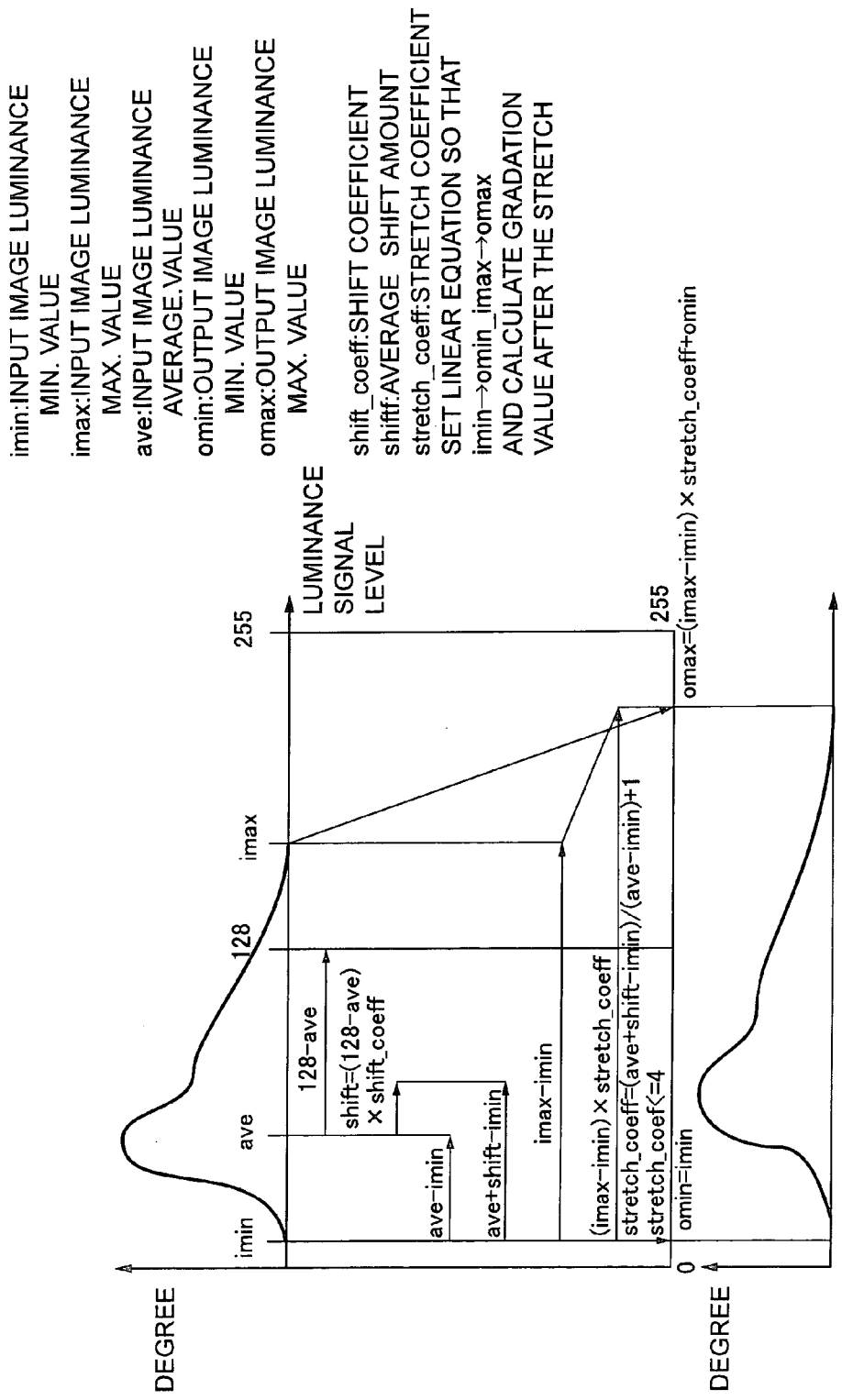
FIG. 8 is a diagram showing a correcting process in the large under-exposure and the medium under-exposure.

In FIG. 8, explanation will be made on the assumption that an image before correction shown at the upper stage is referred to as an input image and an image after the correction shown at the lower stage is referred to as an output image.

According to such a correcting method, by subtracting the minimum value of the luminance distribution of the input image (hereinafter, referred to as an input image luminance minimum value imin) from the maximum value of the luminance distribution of the input image (hereinafter, referred to as an input image luminance maximum value imax), a width of luminance distribution in the luminance histogram of the input image is calculated, and the calculated width of the luminance distribution is multiplied by a predetermined coefficient (hereinafter, referred to as a stretch coefficient stretch_coeff), thereby stretching the width of the luminance distribution up to the maximum value of the luminance distribution of the output image (hereinafter, referred to as an output image luminance maximum value omax). By equalizing the minimum value of the width of the luminance distribution to be stretched (hereinafter, referred to as an output image luminance minimum value omin) with the input image luminance minimum value imin, a base point of the stretch is identical to the input image luminance minimum value imin and the width of the luminance distribution in the luminance histogram is stretched from the output image luminance minimum value omin.

The stretch coefficient stretch_coeff will now be described. As mentioned above, in the image data obtained by photographing the image by the proper exposure, since the degree of the luminance level is uniformly distributed in the whole luminance histogram, it is considered that the luminance average value is equal to the intermediate value of the luminance histogram (the intermediate value of the luminance histogram of 256 gradations is equal to 128). The present correction is made in such a manner that in order to shift the luminance average value of the input image (hereinafter, referred to as an input image luminance average value ave) so as to approach the intermediate value, the luminance average value is shifted by a predetermined value (hereinafter, referred to as an average shift amount shift), the stretch coefficient stretch_coeff is added, and the distribution range of the luminance level is stretched.

The average shift amount shift is a value obtained by subtracting the luminance average value ave from 128 as an intermediate value and multiplying a resultant value by a predetermined coefficient (hereinafter, referred to as a shift coefficient shift_coeff). That is, with respect to a distance from the luminance average value ave to the intermediate value, by adding the shift coefficient shift_coeff to the shift distance amount, the luminance average value existing on the low luminance side is corrected by using the shift coefficient shift_coeff so as to be shifted toward the intermediate value. In the embodiment, in the correcting process of the large under-exposure, 0.25 is used as a shift coefficient shift_coeff. In the correcting process of the medium under-exposure, 0.5 is used as a shift coefficient shift_coeff.

The correction contents mentioned above are shown in the following equations (1).

$$omin = imin$$

$$omax = (imax - imin) \times \text{stretch\_coeff} + omin$$

$$\text{stretch\_coeff} = (ave + shift - imin)/(ave - imin) + \alpha$$

Where, stretch_coeff ≦ 4.0, $$\text{adjustment value } \alpha = 1 \quad (1)$$

$$shift = (128 - ave) \times \text{shift\_coeff}$$

Where,
in the large under-exposure, shift_coeff=0.25
in the medium under-exposure, shift_coeff=0.5

Figure 9:
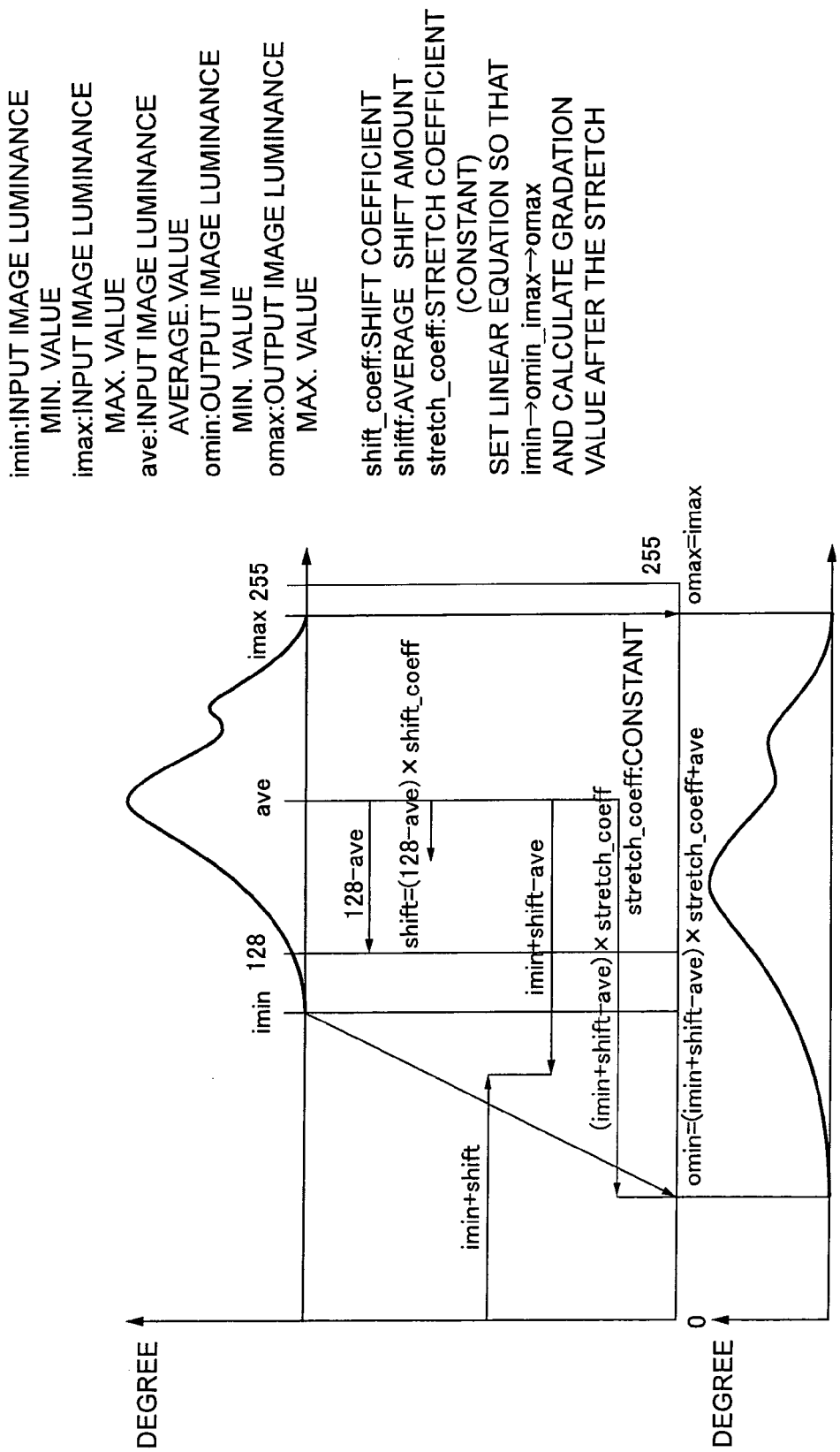
FIG. 9 is a diagram showing a correcting process in the large over-exposure and the medium over-exposure.

The process in the large over-exposure in step S114 and the process in the medium over-exposure in step S113 will now be described with reference to FIG. 9.

The luminance correction of the over-exposure is made on the basis of an idea similar to the correcting process in the under-exposure mentioned above. That is, the luminance average value is shifted so that the luminance average value ave in the luminance histogram of the input image existing on the high luminance side approaches the intermediate value, thereby stretching the width of the luminance distribution.

To add the shift coefficient shift_coeff to the luminance average value ave and shift the value ave toward the intermediate value, the average shift value shift is calculated.

By adding the stretch coefficient (in the present correction, a constant) stretch_coeff on the basis of the average shift value shift, the input image luminance minimum value, and the input image luminance average value ave, the output image luminance minimum value omin in which the input image luminance minimum value imin has been shifted is calculated from the luminance average value ave.

The stretch coefficient (constant) stretch_coeff in the embodiment will now be described. In the embodiment, in the correcting process of the large over-exposure, a constant 1.25 is used as a value stretch_coeff and, in the correcting process of the medium over-exposure, a constant 1.00 is used as a value stretch_coeff.

In the embodiment, by using the constant as stretch_coeff, such a risk that the value becomes too large is prevented.

For example, in the image data of the over-exposure, if the conversion is performed to the image data by using stretch_coeff of a large value so as to correct it, the whole object seems to be a deep and dark image. Since it has been confirmed from experiments that, in general, the image data which is too bright is more attractive than the image data corrected to be too dark, in the embodiment, by using the constant, such correction that the image data of the over-exposure becomes too dark is prevented.

In the embodiment, in the correcting process of the large over-exposure, a constant 0.25 is used as a shift coefficient shift_coeff and, in the correcting process of the medium over-exposure, 0.5 is used as a shift coefficient shift_coeff.

The correction contents mentioned above are shown in the following equations (2).

$$omin = (imin + shift - ave) \times stretch\_coeff + ave$$

$$omax = imax$$

$$shift = (128 - ave) \times shift\_coeff \qquad (2)$$

Where,
in the large over-exposure, shift_coeff=0.25
in the medium over-exposure, shift_coeff=0.5
in the large over-exposure, stretch_coeff=1.25
in the medium over-exposure, stretch_coeff=1.00

A luminance correcting process (backlight process) to the image data which has been determined to be the image in the backlight in step S115 in FIG. 1 will now be described.

Figure 10:
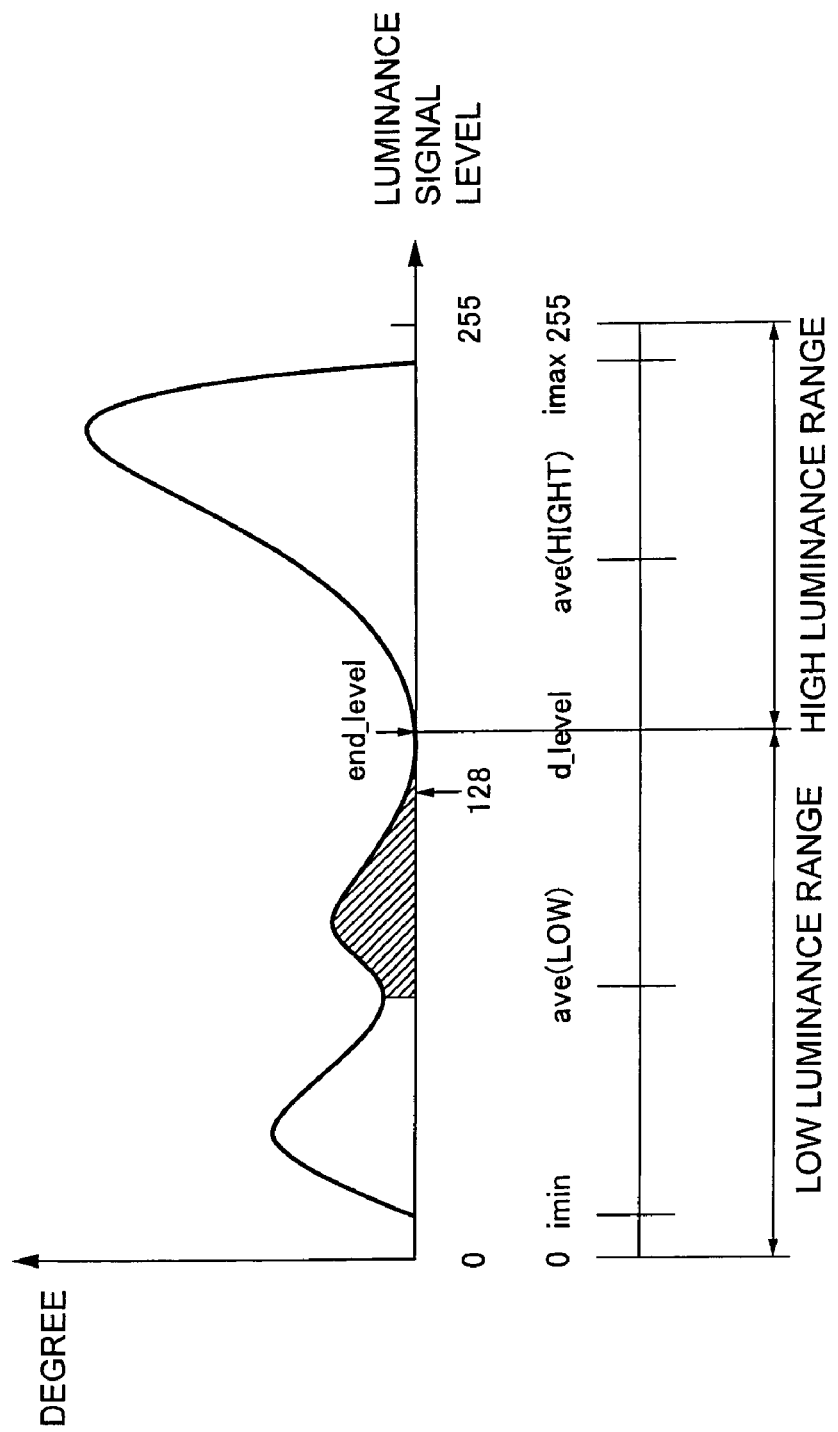
FIG. 10 is a diagram showing a backlight process.

First, as shown in FIG. 10, a luminance histogram of the image data to be corrected is divided into halves to the low luminance side and the high luminance side on the basis of a division luminance level d_level. As a dividing method, for example, it is divided on the basis of an end level of a peak area that is closest to 128 as an intermediate value. That is, a distribution range of the luminance level of the histogram on the low luminance side (hereinafter, referred to as a low luminance histogram) is a range from 0 to d_level and a distribution range of the luminance level of the histogram on the high luminance side (hereinafter, referred to as a high luminance histogram) is a range from d_level to 255.

After that, the correcting process of the under-exposure mentioned above is executed to the low luminance histogram and the correcting process of the over-exposure mentioned above is executed to the high luminance histogram. Thus, in each of the low luminance histogram and the high luminance histogram, the input image luminance minimum value imin, the input image luminance maximum value imax, the output image luminance minimum value omin, and the output image luminance maximum value omax are calculated (the intermediate value of the low luminance histogram is equal to the intermediate value of 0 to d_level and the intermediate value of the high luminance histogram is equal to the intermediate value of d_level to 255).

At this time, in the low luminance histogram, when the output image luminance maximum value omax exceeds the value d_level, the output image luminance maximum value omax of the low luminance histogram becomes the output image luminance minimum value of the high luminance histogram. When the output image luminance maximum value omax does not exceed d_level, the output image luminance maximum value omax of the low luminance histogram becomes d_level.

Figure 12:
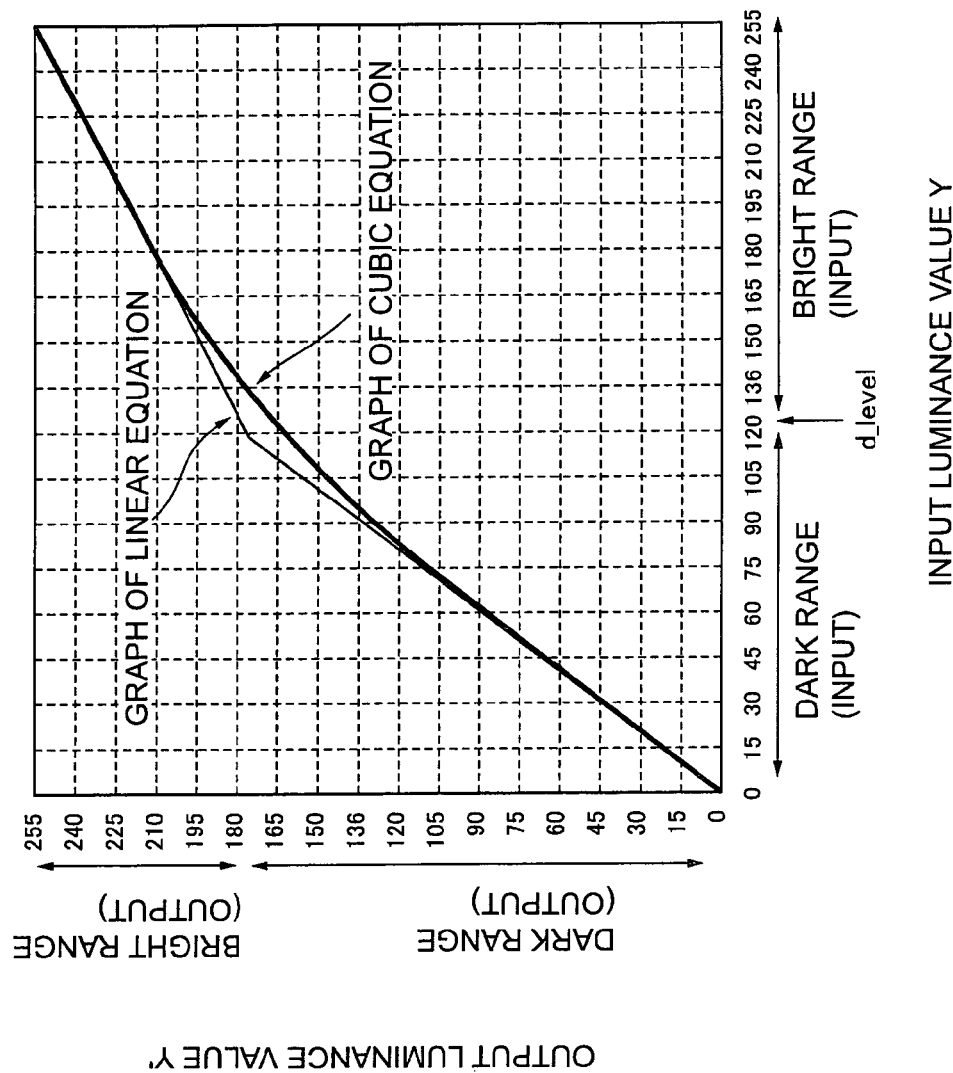
FIG. 12 is a graph showing luminance conversion.

With respect to relations between the low luminance histogram and the high luminance histogram in the input and output images obtained as mentioned above, the following linear equations (3) and (4) are obtained and results of calculations are shown in a graph of FIG. 12. As will be obviously understood from the graph, in a dark range corresponding to the low luminance, since an inclination is larger than 1, the distribution range of the luminance level is stretched to the high luminance side. In a bright range corresponding to the high luminance, since an inclination is smaller than 1, the distribution range of the luminance level is stretched to the low luminance side. Thus, the distribution range of the luminance level is reduced.

$$\text{Dark range: } Y' = a_0 * Y + b_0 \qquad (3)$$

$$\text{Bright range: } Y' = a_1 * Y + b_1 \qquad (4)$$

Where, $a_0$, $b_0$, $a_1$, $b_1$: values based on the luminance minimum values and the luminance maximum values of the input and output images As will be also obviously understood from the graph of the linear equations of FIG. 12, the inclination in a region near d_level is not smooth. To solve such a problem, the luminance conversion is performed by the following cubic equation (5) using coefficients of the linear equations.

$$Y' = A_X Y^3 + B_X Y^2 + C_X Y + D \qquad (5)$$

Where, in the equation (5),
When an input image Y=0, an output image Y'=the output image luminance minimum value omin.
When the input image Y=255, the output image Y'=the output image luminance maximum value omax.
When the input Y=0, the inclination (linear differentiation of the equation (5)) satisfies the inclination (linear differentiation of the equation (3)) $a_0$ of the linear equation of the dark range.
When the input Y=255, the inclination (linear differentiation of the equation (5)) satisfies the inclination (linear differentiation of the equation (4)) $a_1$ of the linear equation of the bright range.

A graph obtained by performing the luminance conversion according to the cubic equation is shown in FIG. 12 showing the graph of the linear equation so as to be overlapped therewith. As will be also obvious from this graph, the inclinations at 0 and 255 of the input and output images are the same and the inclination in a region near d_level is smooth.

Figure 1:
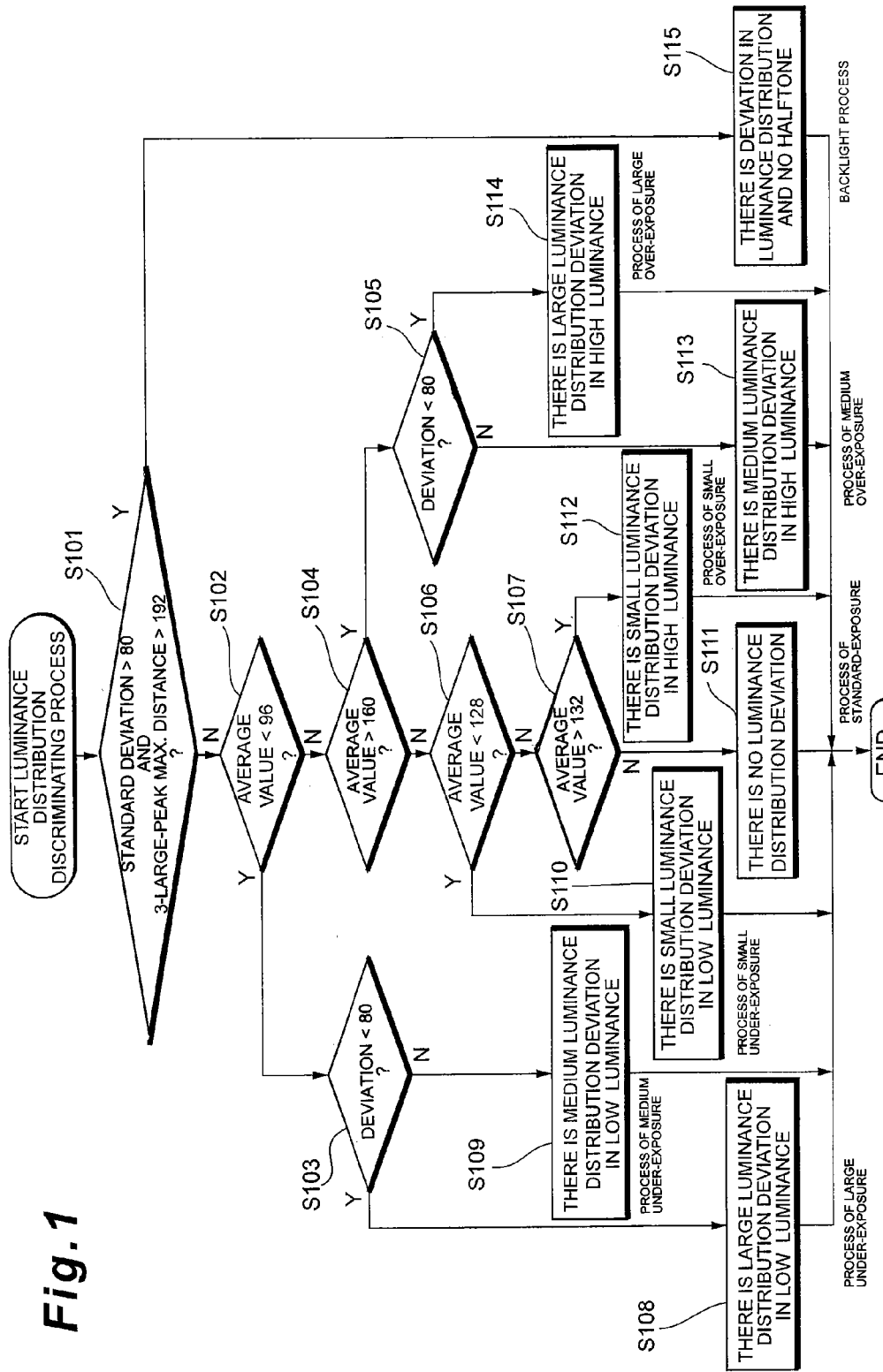
FIG. 1 is a flowchart showing a branching process.
Figure 11:
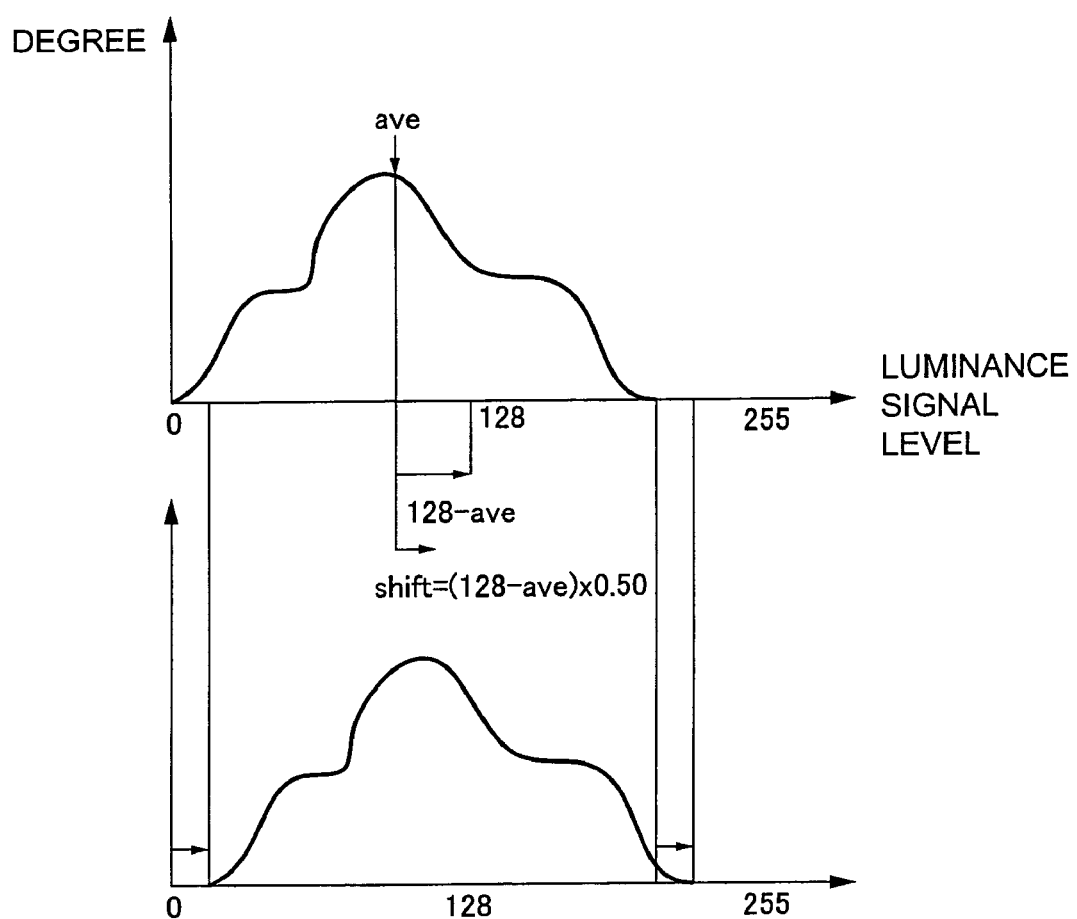
FIG. 11 is a diagram showing a correcting process in the standard exposure, the small under-exposure, and the small over-exposure.

The correcting process to the image data which has been determined to be the image of the small under-exposure in step S110, the image of the standard exposure in step S110, and the image of the small over-exposure in step S112 in FIG. 1 are shown in FIG. 11 and will now be described with reference to FIG. 11.

As mentioned above, the luminance average value in the histogram of the image data obtained by photographing the object by the proper exposure is considered to be the intermediate value of this histogram. On the basis of this idea, to shift the luminance average value ave of the target image data toward the intermediate value, a shift amount shift shown by the following equation (6) using a predetermined coefficient is calculated. The distribution range of the luminance signal level is shifted by using the calculated shift amount shift.

$$shift = (ave - 128) \times 0.50 \qquad (6)$$

As mentioned above, according to the image processing apparatus 10 of the invention, in the histogram showing the luminance of the image data, whether the image data is image data obtained by the photographing in the backlight, the strobo-photographing, or the like is discriminated on the basis of the peak distance which can discriminate that the peak areas are away from each other and the luminance standard deviation which can discriminate the presence or absence of the peak area in the halftone. After the discrimination about the backlight, the strobo-photographing, or the like was made, the discrimination about the image data of the under-exposure, the over-exposure, and the standard exposure is made on the basis of the luminance average value and the luminance standard deviation. Therefore, the exposing state can be properly discriminated also with respect to the image data shown by the luminance histogram in which a plurality of peak areas are deviated.

Further, according to the image processing apparatus 10 of the invention, the proper luminance correction can be made to the image data on the basis of the result which has properly been discriminated.

Embodiment 2

It has been known that if correction is made to an image which was artificially formed, picture quality deteriorates contrarily. An image processing apparatus 100 having an artificial image discriminating unit which discriminates whether the image is an artificially formed image or not in order to prevent the correction to the artificially formed image will now be described.

Figure 13:
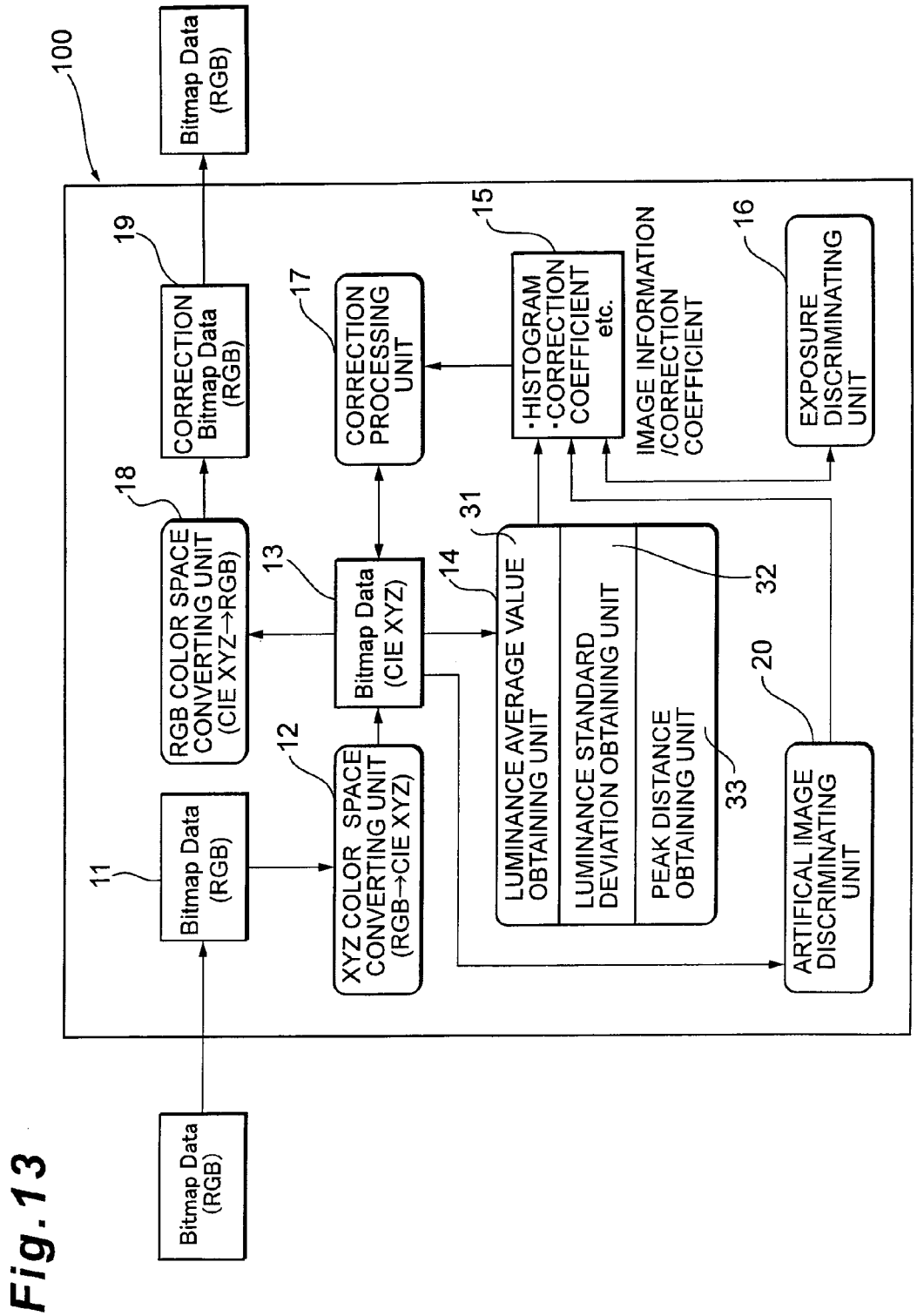
FIG. 13 is a block diagram showing an image processing apparatus according to the embodiment 2.

FIG. 13 is a block diagram showing the image processing apparatus 100 according to the embodiment 2.

The image processing apparatus 100 comprises: the RGB bitmap holding unit 11; the XYZ color space converting unit 12 which converts the RGB values into the values of the XYZ colorimetric system of CIE; the XYZ bitmap holding unit 13 which holds the values of the XYZ colorimetric system of CIE; the arithmetic operation processing unit 14 which forms the histogram of the luminance value Y on the basis of the XYZ bitmap held in the XYZ bitmap holding unit 13 and calculates the luminance average value, the luminance standard deviation, the luminance peaks, and the luminance peak distance on the basis of the histogram; the luminance information holding unit 15 which holds the various values calculated by the arithmetic operation processing unit 14; the exposure discriminating unit 16 which discriminates the exposing state on the basis of the information held in the luminance information holding unit 15; the correction processing unit 17 which makes the correction according to the exposing state discriminated by the exposure discriminating unit 16; the RGB color space converting unit 18 which converts the values of the XYZ colorimetric system of CIE corrected by the correction processing unit 17 into the RGB values; and the correction RGB bitmap holding unit 19 which holds the converted RGB values.

Further, the image processing apparatus 100 comprises an artificial image discriminating unit 20 which discriminates whether the image is an artificially formed image or not on the basis of the bitmap shown by the values of the XYZ colorimetric system of CIE held in the XYZ bitmap holding unit 13.

A discrimination result of the artificial image discriminating unit 20 is held as artificial image discrimination information into the luminance information holding unit 15.

The exposure discriminating unit 16 does not execute the discriminating process of the exposing state to the artificially formed image with reference to the artificial image discrimination information. The correction processing unit 17 does not execute the luminance correction to the artificially formed image data.

Figure 14:
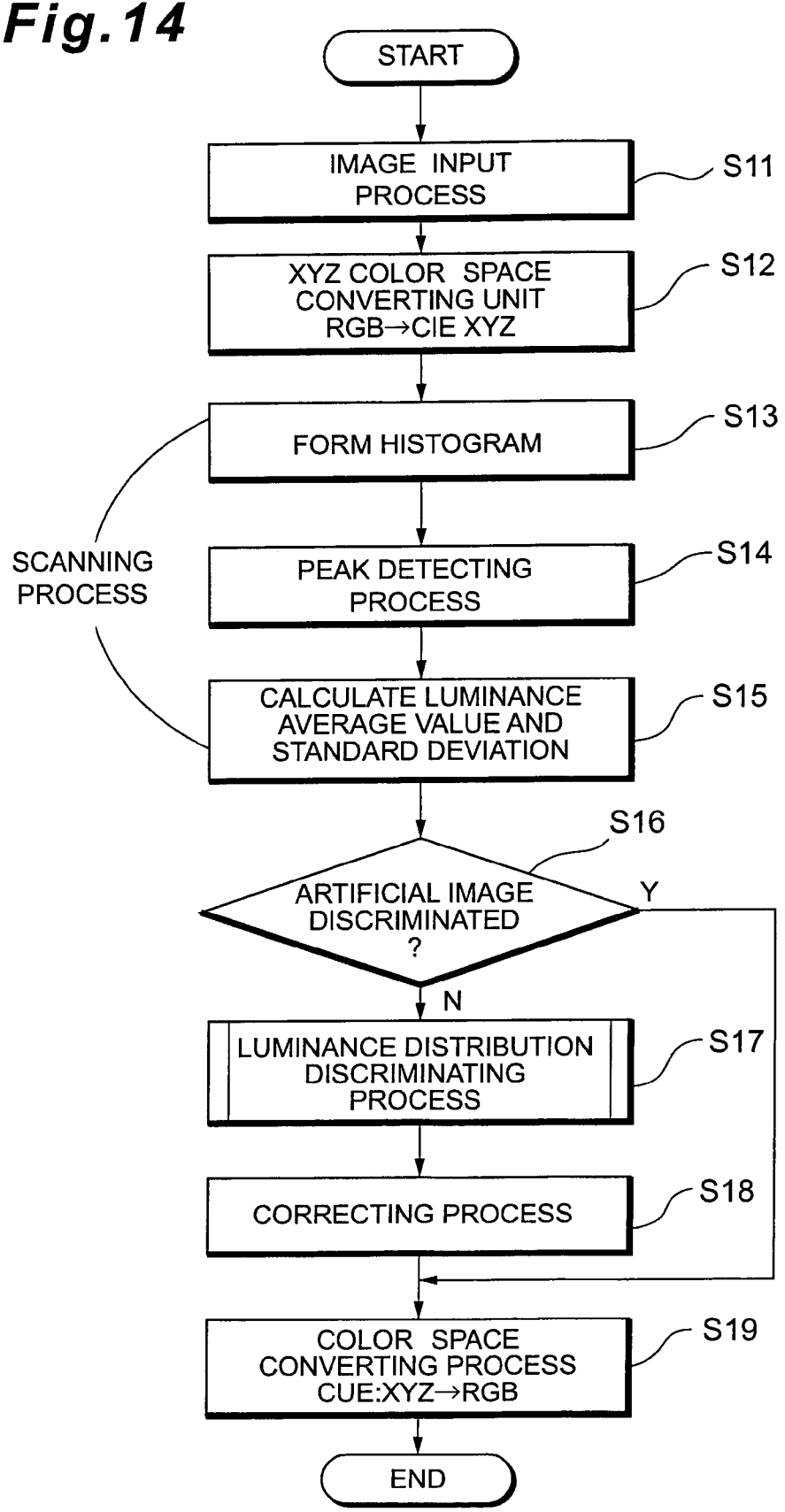
FIG. 14 is a flowchart showing the operation of the image processing apparatus according to the embodiment 2.

The operation of the image processing apparatus 100 in the embodiment 2 will now be described with reference to a flowchart of FIG. 14.

A pointer included in a command which is outputted from the OS indicates an address of the image data comprising a plurality of pixels such as graphic data, image data, or the like.

The bitmap image of the RGB colorimetric system existing in the address is copied and held in the RGB bitmap holding unit 11 (step S11).

The XYZ color space converting unit 12 converts each pixel of the image data held in the RGB bitmap holding unit 11 into the values of the XYZ color space of CIE by the conventional well-known method (step S12).

The converted XYZ values of CIE are held in the XYZ bitmap holding unit 13. Correction is made to the Y values regarding the luminance of the image data of the XYZ colorimetric system held in the XYZ bitmap holding unit 13 by a process, which will be explained hereinafter.

The arithmetic operation processing unit 14 forms a histogram, as a luminance histogram, based on the Y value of the image data converted into the XYZ values of CIE held in the XYZ bitmap holding unit 13 (step S13).

The arithmetic operation processing unit 14 calculates the distance between the peaks of the histogram on the basis of the formed luminance histogram in a manner similar to the foregoing embodiment 1 (step S14).

Further, the arithmetic operation processing unit 14 calculates a luminance average value showing the average value in the formed luminance histogram and a luminance standard deviation showing a degree of dispersion of the luminance distribution from the luminance average value on the basis of such a histogram by the conventionally well-known method (step S15). The various values calculated in the arithmetic operation processing unit 14 are held as luminance information into the luminance information holding unit 15.

At this time, the artificial image discriminating unit 20 discriminates whether the target image data is the artificially formed data or not on the basis of the XYZ values of CIE held in the XYZ bitmap holding unit 13. A discrimination result is held in the luminance information holding unit 15.

The operation of the artificial image discriminating unit 20 will now be described with reference to the drawings.

Figure 15:
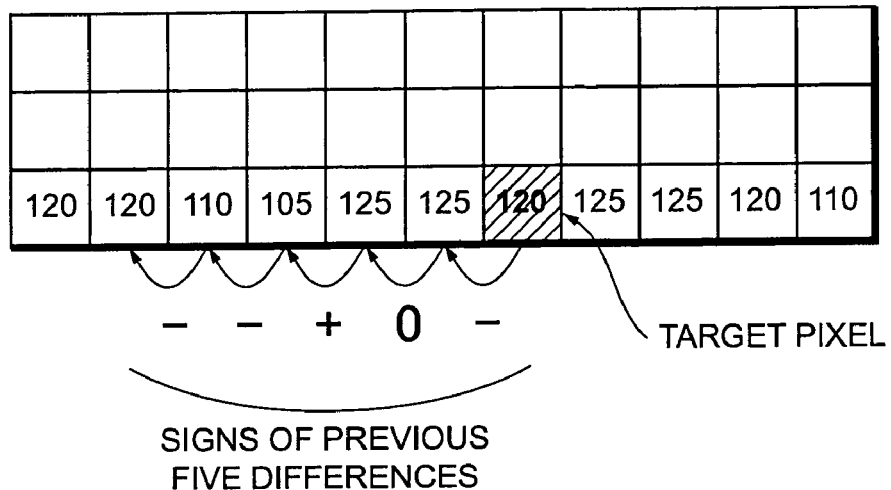
FIG. 15 is a diagram showing an array of luminance values of a natural image.
Figure 16:
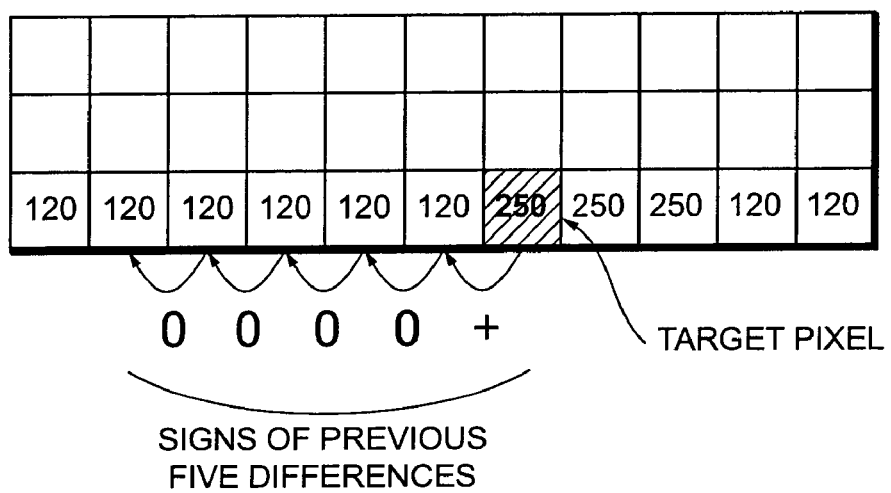
FIG. 16 is a diagram showing an array of luminance values of an artificial image.

FIG. 15 which is used for explanation of the artificial image discriminating unit 20 shows an array of luminance values of each pixel in image data of a natural image such as scenery, portrait, still life, or the like. FIG. 16 shows an array of luminance values of each pixel in artificially formed image data such as graphics or the like.

The artificial image discriminating unit 20 calculates a difference between luminance values of a predetermined pixel (hereinafter, referred to as a target pixel) of the image data as a discrimination target and the pixel just before such a pixel.

In FIG. 15, the luminance value of the target pixel is equal to 120 and the luminance value of the pixel just before the target pixel is equal to 125, so that the difference between them is equal to −5. A minus sign of the difference value is held as a target sign.

Subsequently, a difference between the pixel (luminance value 125) by which the difference has been calculated and the pixel (luminance value 125) just before such a pixel is calculated. The difference is equal to 0 and it is held. Further, a difference between the pixel (luminance value 125) by which the difference has been calculated and the pixel (luminance value 105) just before such a pixel is similarly calculated. The difference is equal to +5 and information showing the plus sign is held. After that, difference values between such a pixel and up to the pixel before the target pixel by five pixels are similarly calculated and signs in the difference values are obtained.

The target sign is compared with each sign obtained in each difference value and the counting operation at the time when they are the same sign is executed. For example, since the target sign in FIG. 15 is the minus sign (−) and there is the same sign as the minus sign, a count value is increased by +1.

Since the target sign in FIG. 16 is a plus sign (+) and the same sign as the plus sign does not exist, the count value is not changed (assumed to be +0).

The target pixel is sequentially shifted and after the counting operation was finished with respect to all pixels, the count value is divided by the number of all pixels and a value obtained by normalizing the division result is compared with a predetermined threshold value.

Thus, in the artificially formed image data such as graphics or the like, since the change in luminance value is generally smaller than that of the image data of the natural image such as scenery, portrait, still life, or the like, for example, 0.6 is used as a threshold value. The image data in which the threshold value is less than 0.6 is determined to be the artificially formed image data such as graphics or the like. On the other hand, the image data in which the threshold value is equal to or larger than 0.6 is determined to be the image data such as a natural image or the like. The discrimination result is sent as artificial image discrimination information from the artificial image discriminating unit 20 to the luminance information holding unit 15 and held therein.

Returning to the flowchart of FIG. 14, subsequently, the operation of the image processing apparatus 100 will be described. On the basis of the information held in the luminance information holding unit 15, the exposure discriminating unit 16 discriminates whether the target image data has artificially been formed or not (step S16).

If it is determined to be the artificially formed image data, the image data is not corrected but the bitmap image of the XYZ colorimetric system held in the XYZ bitmap holding unit 13 is converted into the RGB values by the RGB color space converting unit 18 by the conventionally well-known method.

On the contrary, if it is determined that the image data is not the artificially formed image data, that is, it is the image data of the natural image, the exposure discriminating unit 16 discriminates the exposing state in a manner similar to the foregoing embodiment 1 (step S17).

After that, the luminance correction based on the discrimination result is made by the correction processing unit 17 and the luminance of the image data is corrected in accordance with the exposing state (step S18).

The image data corrected by the correction processing unit 17 is held in the XYZ bitmap holding unit 13.

Subsequently, the RGB color space converting unit 18 converts the bitmap image of the XYZ colorimetric system held in the XYZ bitmap holding unit 13 into the RGB values by the conventionally well-known method (step S19).

The bitmap data converted into the RGB values is held as correction bitmap data into the correction RGB bitmap holding unit 19. The data held in the holding unit 19 is outputted in response to a request of the printer driver.

As mentioned above, according to the image processing apparatus 100 of the invention, in addition to such an effect that the exposing state of the image data is properly discriminated and the luminance can be properly corrected on the basis of the discrimination result, by providing the artificial image discriminating unit which discriminates the artificially formed image data, the artificial image and the natural image are identified. Therefore, the luminance correction to the image data identified to be the artificial image can be prevented. Thus, the risk that the picture quality of the artificially formed image data is deteriorated due to the luminance correction can be prevented.

Embodiment 3

Subsequently, if a size of bitmap image data which is sent to the image processing apparatus is large, the data is divided into a plurality of parts for convenience of a memory in accordance with a print request from the application. The bitmap image data to which what is called a banding has been made is sent to the image processing apparatus.

Since each of the banded bitmap image data is inherently the same image, there is a risk that if the correction of the luminance value is made to each of the divided image data, a connecting portion of each image data called a band becomes conspicuous due to the luminance correction. A same image discriminating unit 24 which discriminates whether the bitmap image data as image data that is sequentially inputted is the same image or not is provided for an image processing apparatus 200 according to the embodiment 3 in order to prevent the foregoing inconvenience.

Figure 17:
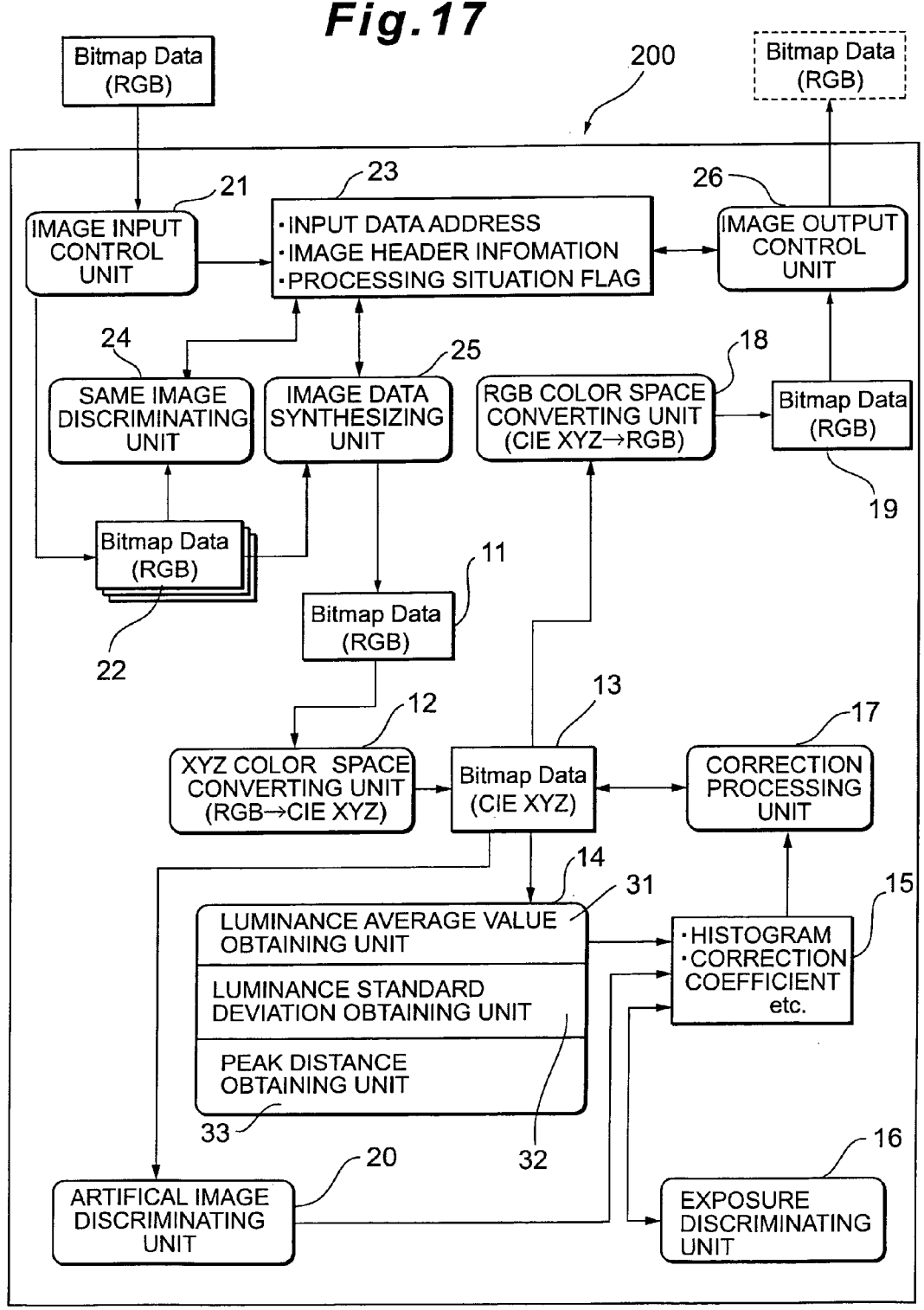
FIG. 17 is a block diagram showing an image processing apparatus according to the embodiment 3.

FIG. 17 is a block diagram showing a construction of the image processing apparatus 200 in the embodiment 3.

The image processing apparatus 200 comprises: the RGB bitmap holding unit 11; the XYZ color space converting unit 12 which converts the RGB values into the values of the XYZ colorimetric system of CIE; the XYZ bitmap holding unit 13 which holds the XYZ values of CIE; the artificial image discriminating unit 20 which discriminates whether the image data is the artificially formed image data or not on the basis of the Y value showing the luminance of the XYZ values of CIE; the arithmetic operation processing unit 14 which forms the histogram of the luminance value Y on the basis of the XYZ values of CIE and calculates the luminance average value, the luminance standard deviation, and the luminance peak distance on the basis of the histogram; the luminance information holding unit 15 which holds the values calculated by the arithmetic operation processing unit 14 as luminance information; the exposure discriminating unit 16 which discriminates the exposing state on the basis of the luminance information; the correction processing unit 17 which makes the correction according to the exposing state; the RGB color space converting unit 18 which converts the corrected XYZ values of CIE into the RGB values; and the correction RGB bitmap holding unit 19 which holds the converted RGB values.

Further, the image processing apparatus 200 comprises: an image input control unit 21 which controls image data that is inputted; an image data storing unit 22 which stores the image data that is inputted; a management table holding unit 23 which holds a management table that is formed by control of the image input control unit 21; the same image discriminating unit 24 which discriminates whether the image data inputted and the image data inputted just before the data are the same image data or not; an image data synthesizing unit 25 which synthesizes the image data which was determined to be the same image data; and an image output control unit 26 which controls the image data to be outputted.

The image management table held in the management table holding unit 23 will now be described.

FIG. 19 is a diagram showing a construction of the image management table.

The image management table is constructed by: an index for managing the image data to be processed; a lateral dimension of the image data; a vertical dimension of the image data; a same image discrimination flag showing the discrimination result of the same image data; a process start flag; and the like. This construction is provided every image data.

Values of the vertical dimension and the lateral dimension of the image data in the image management table are set by the image input control unit 21.

1 or 0 is set into the same image discrimination flag on the basis of the discrimination result of the same image discriminating unit 24. The same image discriminating unit 24 discriminates whether the image data shown by the pointer inputted at present and the image data shown by the pointer inputted previously are what is called the same banded image or not. If they are the same image, 1 is set into the same image discrimination flag. If they are not the same image, 0 is set into the same image discrimination flag. Further, when the same image discriminating unit 24 determines that they are not the same image, 1 is set into the process start flag of the data inputted before this discrimination.

1 or 0 is set into the process start flag on the basis of the discrimination result in the image input control unit 21. When no value is shown in the pointer indicative of the image data inputted to the image input control unit 21, that is, the image input control unit 21 determines that the data just before is the end of the banded image data, and 1 is set into all process start flag before the data just before it is determined to be the end of the banded image data. Each data corresponding to indices in which 1 has been set into the process start flag is synthesized by the image data synthesizing unit 25 by processes, which will be explained hereinlater.

The image management table is cleared by the image output control unit 26. In the clearing process, the image data in which the process start flag is equal to 1 is erased, a new index is added again to the residual image data, and 1 is set into the same image discrimination flag.

Figure 18:
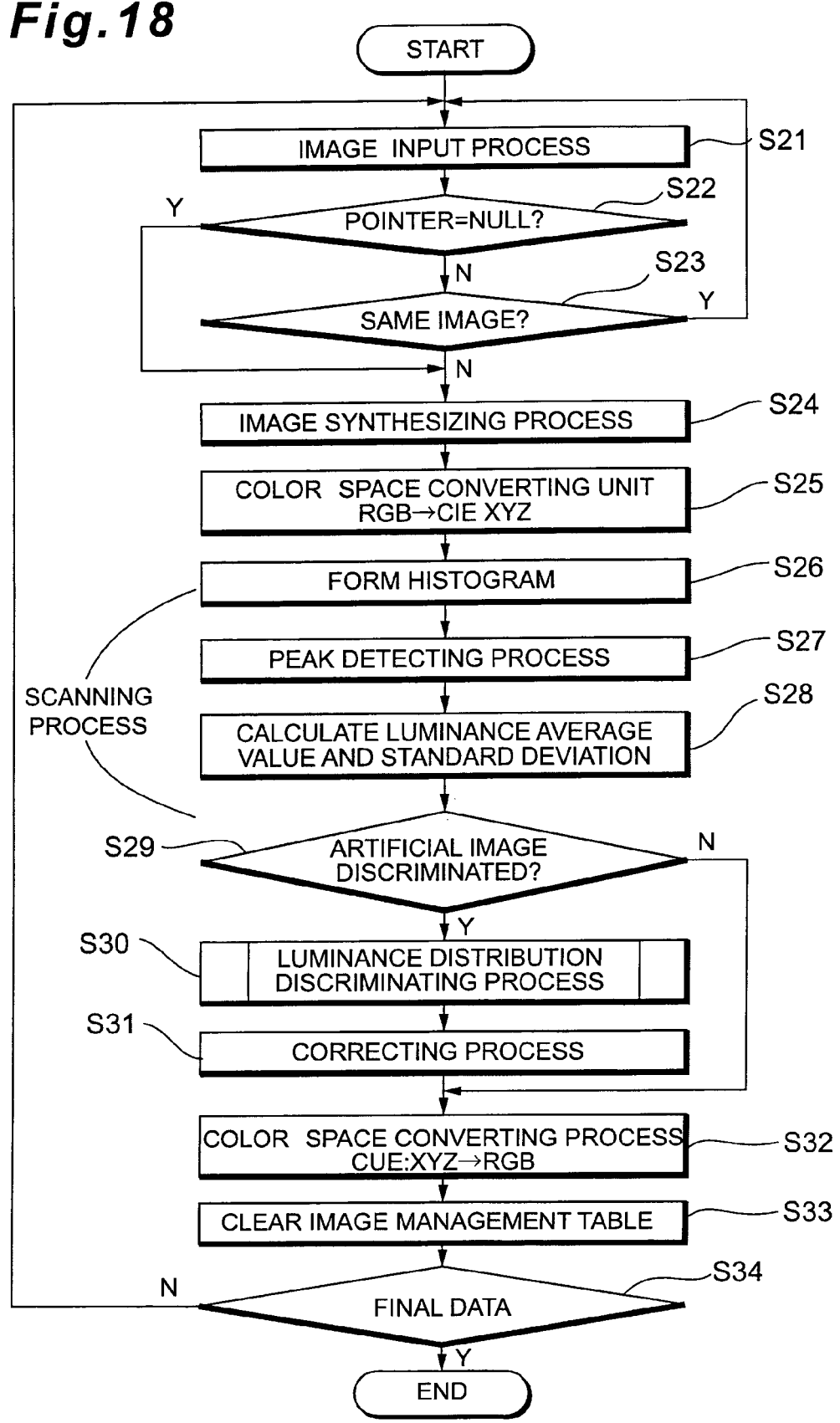
FIG. 18 is a flowchart showing the operation of the image processing apparatus according to the embodiment 3.

The operation of the image processing apparatus 200 in the embodiment 3 will now be described with reference to a flowchart of FIG. 18.

A pointer showing the image data to be processed is inputted to the image input control unit 21 (step S21).

The image input control unit 21 confirms the presence or absence of the contents of the pointer (step S22).

If the contents shown by the pointer do not exist (when NULL as a terminal symbol is shown), the image input control unit 21 determines that the image just before it is the final image of the image data to be processed. 1 is set into all process start flags in the image management table. After that, a process for synthesizing the image data is executed in step S24, which will be explained hereinafter.

On the other hand, if the address of the image data to be processed is shown by the pointer, the bitmap image of the RGB colorimetric system of the address shown by the pointer is copied and held in the image data storing unit 22.

After that, the same image discriminating unit 24 discriminates whether an absolute value of a difference between the first line of the image data inputted at present and the final line of the image data inputted previously lies within a predetermined threshold value or not. This discrimination is made on the basis of such a principle that the series of image data which is banded by the first line of the image inputted at present and the final line of the image inputted previously does not extremely change in the banding position. When the difference absolute value in the banding position lies within a range of the predetermined threshold value, the same image discriminating unit 24 determines that the data is the series of image data and, if it is out of the range of the predetermined threshold value, the same image discriminating unit 24 determines that the data is the data having no association (step S23).

If the same image discriminating unit 24 determines that the data is the series of image data, it sets 1 into the same image discrimination flag. The processing routine is again returned to step S21 and the input of the pointer is continuously received until the terminal symbol NULL is detected.

If the same image discriminating unit 24 determines that the data is the image data having no association, it sets 0 into the same image discrimination flag of the image which was inputted this time and sets 1 into the process start flag of the image inputted before then.

After that, the image data synthesizing unit 25 reads out the images corresponding to the indices in which the process start discrimination flag in the image management table is equal to 1 and the same image discrimination flag inputted until the previous time is equal to 1 from the image data storing unit 22 and sequentially synthesizes them (step S24).

The synthesized bitmap image of the RGB colorimetric system is held in the RGB bitmap holding unit 11.

With respect to each pixel of the image data held in the RGB bitmap holding unit 11, the RGB values are converted into values of the XYZ color space of CIE by a conventionally well-known method (step S25).

The converted XYZ values of CIE are held in the XYZ bitmap holding unit 13. By a process, which will be explained hereinafter, correction is made to the Y value regarding the luminance of the image data of the XYZ colorimetric system held in the XYZ bitmap holding unit 13.

After that, the arithmetic operation processing unit 14 forms a histogram, as a luminance histogram, based on the Y value of the image data converted into the XYZ values of CIE held in the XYZ bitmap holding unit 13 (step S26).

The arithmetic operation processing unit 14 calculates a distance between the peaks of the histogram on the basis of the formed luminance histogram (step S27).

Further, on the basis of the formed luminance histogram, the arithmetic operation processing unit 14 calculates a luminance average value showing an average value in such a histogram and a luminance standard deviation showing a degree of dispersion of the luminance distribution from the luminance average value by the conventionally well-known method (step S28). The various values calculated in the arithmetic operation processing unit 14 are held as luminance information into the luminance information holding unit 15.

The luminance information holding unit 15 holds the result of the discrimination made by the artificial image discriminating unit 20 regarding whether the image data to be processed is the artificially formed data or not on the basis of the XYZ values of CIE held in the XYZ bitmap holding unit 13.

On the basis of the information held in the luminance information holding unit 15, the exposure discriminating unit 16 discriminates whether the target image data has artificially been formed or not (step S29).

If it is determined that the target image data is the artificially formed image data, the image data is not corrected but the bitmap image of the XYZ colorimetric system held in the XYZ bitmap holding unit 13 is converted into the RGB values by the RGB color space converting unit 18 by the conventionally well-known method.

On the contrary, if it is determined that the image data is not the artificially formed image data, the exposure discriminating unit 16 discriminates the exposing state (step S30).

After that, the luminance correction based on the discrimination result is made by the correction processing unit 17 and the luminance of the image data is corrected in accordance with the exposing state (step S31).

The image data corrected by the correction processing unit 17 is held in the XYZ bitmap holding unit 13.

Subsequently, the RGB color space converting unit 18 converts the bitmap image of the XYZ colorimetric system held in the XYZ bitmap holding unit 13 into the RGB values by the conventionally well-known method (step S32). The converted RGB values are held in the correction RGB bitmap holding unit 19. The data held in the holding unit 19 is outputted on the basis of the control of the image output control unit in response to the request of the printer driver.

At this time, to clear the image management table, the image output control unit erases the image data in which the process start flag is equal to 1, adds a new index again to the residual image data, and sets 1 into the same image discrimination flag (step S33).

After that, whether the image to be processed remains in the image management table or not is discriminated (step S34). By this discrimination, when there is an image which is not processed yet, the processing routine is returned to the process of step S21 and processes similar to those mentioned above are executed until the image which is not processed yet is extinguished.

As mentioned above, according to the image processing apparatus 200 of the invention, by adding the process for the banded image data, the series of divided image data is processed in a lump. Therefore, a plurality of image data in the same image are individually processed and the risk that the picture quality deteriorates can be prevented.

Although the exposing state is divided into eight gradations and the branching process in each gradation is shown in the foregoing embodiments, the invention is not limited to such an example but a construction in which the number of gradations is properly changed in accordance with the contents of the luminance correction can be also used.

In the foregoing embodiments, the numerical values of the distribution discrimination value and the halftone presence/absence discrimination value used for discrimination about the backlight image, the exposing state discrimination value used for discrimination about the exposing state, and the like are shown as examples. Those values can be also properly changed.

In the foregoing embodiments, the numerical values used in the equations in the correcting process are shown as examples and can be also arbitrarily changed.

As mentioned above, according to the invention, by using the histogram showing the luminance of the image data, whether the image data is the data of the backlight image or not is discriminated on the basis of the luminance standard deviation showing the degree of dispersion of the luminance distribution in the luminance histogram from the luminance average value and the peak distance indicative of the distance between the peaks in the histogram, and the exposing state of the image data is discriminated on the basis of the luminance average value and the luminance standard deviation. Thus, the luminance correction can be properly made even to the image data in the deviated exposing state in which there are a plurality of peak areas.

The present invention is not limited to the foregoing embodiments but many modifications and variations are possible within the spirit and scope of the appended claims of the invention.

What is claimed is:

1. An image processing method of making luminance correction on the basis of a luminance histogram showing distribution of a luminance level of image data in which an image is expressed by a numerical value, comprising the steps of:

obtaining a luminance average value in said luminance histogram, a luminance standard deviation indicative of a degree of dispersion of luminance distribution from said luminance average value, and a peak distance value which indicates a longest distance between peaks is calculated in said luminance histogram in the case where plural peaks exist, so that plural distances between respective peaks exist;

comparing a distribution discrimination value which can discriminate whether a distribution deviation of the luminance level exists on a low luminance side or a high luminance side in said luminance histogram or not with the obtained peak distance value, and comparing a halftone presence/absence discrimination value which can discriminate whether the distribution deviation of the luminance levels does not exist in a halftone in said luminance histogram or not with the obtained standard deviation, thereby discriminating whether said image is a backlight image or not on the basis of results of said comparisons; and comparing each of said luminance average value and said luminance standard deviation by using an exposing state discrimination value which can discriminate the exposing state, thereby discriminating an exposing state of an image other than the backlight image.

2. The image processing method according to claim 1, wherein in said image process, luminance correction according to a backlight process to the backlight image, an under-exposure process to an under-exposure image, an over-exposure process to an over-exposure image, and a standard exposure process to a standard exposure image is made in accordance with the exposing state of said image.

3. The image processing method according to claim 2, wherein in said over-exposure process, in a histogram of said over-exposure image, said histogram is stretched in accordance with the histogram of said over-exposure image so as to shift the luminance average value existing on the high luminance side toward a predetermined value of said histogram.

4. The image processing method according to claim 3, wherein said predetermined value is an intermediate value in the histogram.

5. The image processing method according to claim 2, wherein in said standard exposure process, in a histogram of said standard exposure image, the luminance average value is shifted toward a predetermined value in accordance with said histogram.

6. The image processing method according to claim 5, wherein in said backlight process, contacts where the histogram on said low luminance side and the histogram on said high luminance side have been respectively stretched are smoothly shown by using a three-dimensional function.

7. The image processing method according to claim 5, wherein said predetermined value is an intermediate value in the histogram.

8. The image processing method according to claim 2, wherein in said backlight process, a histogram of said backlight image is divided into halves, the histogram on said low luminance side is stretched in accordance with the histogram of said backlight image so as to shift the luminance average value existing on the low luminance side toward a predetermined value, and the histogram on said high luminance side is stretched in accordance with the histogram of said backlight image so as to shift the luminance average value existing on the high luminance side toward said predetermined value.

9. The image processing method according to claim 8, wherein said predetermined value is an intermediate value in the histogram.

10. The image processing method according to claim 1, wherein in said under-exposure process, in a histogram of said under-exposure image, said histogram is stretched in accordance with the histogram of said under-exposure image so as to shift the luminance average value existing on the low luminance side toward a predetermined value of said histogram.

11. The image processing method according to 10, wherein said predetermined value is an intermediate value in the histogram.

12. The image processing method according to claim 1, wherein prior to discriminating said exposing state, whether said image data is artificially formed image data or not is discriminated, and if it is determined that said image data is the artificially formed image data, the luminance correction is not made to said image data.

13. The image processing method according to claim 1, wherein if it is determined that said image data is a part of a series of image data constructed by a plurality of data, said image process is executed to the image data obtained by collecting a series of image data.

14. An image processing method for discriminating an exposure state of image data on the basis of a luminance histogram which indicates a distribution of luminance level of the image data and is generated from the image data, comprising the steps of:

calculating a luminance deviation value indicating a distribution state of luminance level from the luminance histogram;

detecting one or more peaks from the luminance histogram;

calculating a peak distance value which indicates the longest distance between peaks in the case that plural peaks exist so that plural distances between respective peaks exist; and discriminating that the image is a backlight image when the luminance deviation value is greater than or equal to a first predetermined value and the peak distance value is greater than or equal to a second predetermined value.

15. An image processing apparatus for discriminating an exposure state of image data on the basis of a luminance histogram which indicates a distribution of luminance level of the image data and is generated from the image data, said apparatus comprising:

a luminance standard deviation unit which calculates a luminance deviation value indicating a distribution state of luminance level from the luminance histogram;

a peak distance obtaining unit which detects one or more peaks from the luminance histogram; and an exposure discriminating unit which calculates a peak distance value which indicates the longest distance between peaks in the case that plural peaks exist so that plural distances between respective peaks exist; and discriminates that the image is a backlight image when the luminance deviation value is greater than or equal to a first predetermined value and the peak distance value is greater than or equal to a second predetermined value.

16. The image processing apparatus according to claim 15, further comprising an artificial image discriminating unit which discriminates whether said image data is artificially formed image data or not prior to the discrimination of said exposure discriminating unit, and wherein when it is determined by said artificial image discriminating unit that said image data is the artificially formed image data, said correction processing unit does not make the luminance correction to said image data.

17. The image processing apparatus according to claim 15, further comprising a same image discriminating unit which discriminates whether said image data is a series of image data constructed by a plurality of data or not, and wherein if said same image discriminating unit determines that said image data is same banded image data, said image process is executed to the image data obtained by collecting a series of image data.

* * * * *